US012219378B2

(12) United States Patent
Yu et al.

(10) Patent No.: US 12,219,378 B2
(45) Date of Patent: Feb. 4, 2025

(54) SIGNAL TRANSMISSION METHOD AND APPARATUS

(71) Applicant: HUAWEI TECHNOLOGIES CO., LTD., Shenzhen (CN)

(72) Inventors: Yingjie Yu, Shanghai (CN); Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 533 days.

(21) Appl. No.: 17/403,234

(22) Filed: Aug. 16, 2021

(65) Prior Publication Data

US 2021/0377774 A1 Dec. 2, 2021

Related U.S. Application Data

(63) Continuation of application No. PCT/CN2020/071296, filed on Jan. 10, 2020.

(30) Foreign Application Priority Data

Feb. 15, 2019 (CN) .......................... 201910117746.3

(51) Int. Cl.
H04W 72/04 (2023.01)
H04L 5/00 (2006.01)
(Continued)

(52) U.S. Cl.
CPC .......... *H04W 24/10* (2013.01); *H04L 5/0048* (2013.01); *H04W 72/046* (2013.01); *H04W 72/23* (2023.01); *H04W 12/104* (2021.01)

(58) Field of Classification Search
None
See application file for complete search history.

(56) References Cited

U.S. PATENT DOCUMENTS

2014/0024388 A1* 1/2014 Earnshaw ............. H04L 5/0073
455/452.2
2015/0229450 A1* 8/2015 Noh ...................... H04L 5/0051
370/329
(Continued)

FOREIGN PATENT DOCUMENTS

CN 108737048 A 11/2018
CN 108809595 A 11/2018
(Continued)

OTHER PUBLICATIONS

Fraunhofer IIS, Fraunhofer HHI, NR beam management supporting multi-gNB measurements for positioning. 3GPP TSG RAN WG1 Meeting #95, Spokane, US, Nov. 12-16, 2018, R1-1813583, 8 pages.

(Continued)

*Primary Examiner* — Pamit Kaur
(74) *Attorney, Agent, or Firm* — HAUPTMAN HAM, LLP

(57) ABSTRACT

This application provides a signal transmission method and apparatus. The method includes: A neighboring cell sends downlink reference signal resource configuration information to a serving cell. The serving cell sends a downlink reference signal measurement request including downlink reference signal resource configuration information to a terminal device. The neighboring cell and the terminal device transmit a downlink reference signal based on the downlink reference signal resource configuration information. The terminal device obtains a downlink reference signal measurement result. The terminal device sends the downlink reference signal measurement result to the serving cell. The serving cell sends the downlink reference signal measurement result to the neighboring cell, or sends, to the neighboring cell, beam information that is about a beam (Continued)

between the neighboring cell and the terminal device and that is determined based on the downlink reference signal measurement result.

12 Claims, 7 Drawing Sheets

(51) Int. Cl.
*H04W 24/10* (2009.01)
*H04W 72/044* (2023.01)
*H04W 72/23* (2023.01)
*H04W 12/104* (2021.01)

(56) References Cited

U.S. PATENT DOCUMENTS

| | | | | |
|---|---|---|---|---|
| 2016/0269087 | A1* | 9/2016 | Subramanian | H04B 7/024 |
| 2017/0325244 | A1* | 11/2017 | Zhang | H04W 72/542 |
| 2018/0217228 | A1 | 8/2018 | Edge et al. | |
| 2018/0249430 | A1* | 8/2018 | Moosavi | H04L 5/0048 |

FOREIGN PATENT DOCUMENTS

| | | | |
|---|---|---|---|
| CN | 108811007 A | 11/2018 | |
| EP | 3923651 A1 | 12/2021 | |
| WO | 2017196246 A2 | 11/2017 | |
| WO | WO-2018204340 A1 * | 11/2018 | ........... H04B 7/0695 |

OTHER PUBLICATIONS

3GPP TS 36.305 V15.0.0 (Jul. 2018), 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN(Release 15), 85 pages.

3GPP TS 38.305 V15.0.0 (Jun. 2018), 3rd Generation Partnership Project; Technical Specification Group Radio Access Network; NG Radio Access Network (NG-RAN); Stage 2 functional specification of User Equipment (UE) positioning in NG-RAN(Release 15), 57 pages.

3GPP TS 36.455 V15.0.0 (Jun. 2018), 3rd Generation Partnership Project; Technical Specification Group Radio Access Network; Evolved Universal Terrestrial Radio Access (E-UTRA); LTE Positioning Protocol A (LPPa)(Release 15), 83 pages.

3GPP TS 36.423 V15.1.0 (Mar. 2018), 3rd Generation Partnership Project; Technical Specification Group Radio Access Network; Evolved Universal Terrestrial Radio Access Network (E-UTRAN); X2 application protocol (X2AP)(Release 15), 354 pages.

3GPP TS 36.331 V15.2.2 (Jun. 2018), 3rd Generation Partnership Project; Technical Specification Group Radio Access Network; Evolved Universal Terrestrial Radio Access (E-UTRA); Radio Resource Control (RRC); Protocol specification (Release 15), 791 pages.

Chinese Office Action issued in corresponding Chinese Application No. 201910117746.3, dated Dec. 30, 2020, pp. 1-11.

International Search Report issued in corresponding International Application No. PCT/CN2020/071296, dated Mar. 23, 2020, pp. 1-10.

European Search Report issued in corresponding European Application No. 20755507.9, dated Feb. 24, 2022, pp. 1-8.

* cited by examiner

SIGNAL TRANSMISSION METHOD AND APPARATUS

CROSS-REFERENCE TO RELATED APPLICATIONS

This application is a continuation of International Application No. PCT/CN2020/071296, filed on Jan. 10, 2020, which claims priority to Chinese Patent Application No. 201910117746.3, filed on Feb. 15, 2019, The disclosures of the aforementioned applications are hereby incorporated by reference in their entireties.

TECHNICAL FIELD

This application relates to the communication field, and specifically, to a signal transmission method and apparatus.

BACKGROUND

With rapid development of communication technologies, high-precision positioning is gradually determined as an important research project in 3GPP 5G. Scenarios of 5G positioning mainly include: enhanced mobile broadband (eMBB) outdoor, eMBB indoor, ultra-reliable low-latency communication (URLLC), massive machine-type communications (mMTC), and internet of things (TOT). 5G positioning has characteristics such as high security, scalability, high availability, and precision assurance in high-speed applications.

Currently, high-precision positioning manners include manners such as an uplink time difference of arrival (UT-DOA) positioning method, an uplink angle of arrival (UAOA) positioning method, an enhanced cell identifier (ECID) positioning method, and a multi-cell round trip time (Multi-RTT) positioning method. For example, in the UTDOA positioning method, a terminal device sends an uplink reference signal, a serving cell and a neighboring cell that are of the terminal device receive the uplink reference signal sent by the terminal device, and measure receiving time information of the uplink reference signal. A location management device calculates an uplink time difference of arrival based on receiving time information about receiving, by each cell, the uplink reference signal, to position the terminal device.

In 5G, a sounding reference signal (SRS) is an uplink reference signal sent by a terminal device. The SRS may be used for positioning, for example, may be used in the foregoing UTDOA positioning method, UAOA positioning method, ECID positioning method, or multi-RTT positioning method.

In 5G, high-frequency communication is used, that is, a signal in a high frequency band (for example, a frequency band higher than 6 GHz) is used to transmit data. A main problem of high-frequency communication is that energy of a signal sharply decreases as a transmission distance increases, resulting in a relatively short transmission distance of the signal. To overcome this problem, an analog beam technology is proposed for high-frequency communication. The analog beam technology means that signal energy is concentrated in a relatively small range by using a large-scale antenna array, to form a signal similar to a light beam, thereby increasing a transmission distance. This signal similar to a light beam may be referred to as an analog beam, which is referred to as a beam for short. In other words, in 5G, the terminal device may generate different beams, where the different beams point to different transmission directions, and the terminal device may send signals by using the different beams.

In 5G, when the terminal device is positioned by using the foregoing positioning methods, the following problem exists: Because the terminal device may send the signals by using the different beams, to detect a signal reported by the terminal device, a neighboring cell needs to sweep each beam of the terminal device. This increases SRS measurement time and reduces SRS measurement efficiency, and consequently affects positioning efficiency of the terminal device.

SUMMARY

This application provides a signal transmission method and apparatus, so that when measuring an SRS sent by a terminal device, a neighboring cell does not need to sweep each beam of the terminal device, thereby improving SRS measurement efficiency, and further improving positioning efficiency of the terminal device.

A first aspect provides a signal transmission method, where the method includes: receiving, by a serving cell, downlink reference signal resource configuration information from a neighboring cell; sending, to a terminal device, a downlink reference signal measurement request that includes the downlink reference signal resource configuration information; receiving, from the terminal device, a downlink reference signal measurement result obtained through measurement based on the downlink reference signal resource configuration information; and sending the downlink reference signal measurement result or beam information determined based on the downlink reference signal measurement result to the neighboring cell.

It should be understood that, after obtaining beam information about a beam between the neighboring cell and the terminal device, in an SRS measurement process, the neighboring cell may directly receive, by using the beam information, an SRS sent by the terminal device, to avoid a case in which the neighboring cell sweeps each beam of the terminal device. Therefore, SRS measurement efficiency can be improved. In addition, energy consumption of the neighboring cell can be further reduced.

Therefore, in this application, the serving cell assists the neighboring cell in obtaining the beam information about a beam between the neighboring cell and the terminal device, so that the neighboring cell can measure, by using the beam information, the SRS sent by the terminal device, thereby avoiding a case in which the neighboring cell sweeps each beam of the terminal device. In this way, SRS measurement efficiency can be improved, and energy consumption of the neighboring cell can be further reduced.

A downlink reference signal may be any one of the following: a channel state information reference signal (CSI-RS), a demodulation reference signal (DMRS), a phase-tracking reference signal (PTRS), a positioning reference signal (PRS), a cell reference signal (CRS), synchronization signal/physical broadcast channel block (SS/PBCH block). The SS/PBCH block may be referred to as an SSB for short.

The downlink reference signal resource configuration information includes information used to indicate a time-frequency resource of the downlink reference signal.

For example, the information used to indicate the time-frequency resource of the downlink reference signal includes any one or more of the following: an index of an orthogonal frequency division multiplexing (OFDM) symbol on which the downlink reference signal is located, an index of a resource block (RB) on which the downlink reference signal is located, a subcarrier spacing of the downlink reference signal, and a center frequency of the downlink reference signal.

Optionally, the downlink reference signal resource configuration information may further include any one or more of the following: a type of the downlink reference signal, a number of transmissions of the downlink reference signal, and an antenna port number of the downlink reference signal.

With reference to the first aspect, in a possible implementation of the first aspect, the method further includes: sending sounding reference signal (SRS) resource configuration information to the terminal device, where the SRS resource configuration information includes the beam information.

Optionally, in some implementations, the terminal device may alternatively determine, based on the downlink reference signal measurement result, a transmit beam for sending the SRS.

In this application, both the terminal device and the neighboring cell obtain the beam information, the terminal device may send the SRS based on the beam information, and the neighboring cell also receives the SRS based on the beam information, so that SRS receiving efficiency can be improved, thereby improving SRS measurement efficiency.

With reference to the first aspect, in a possible implementation of the first aspect, the receiving, by a serving cell, downlink reference signal resource configuration information from a neighboring cell includes: sending a downlink reference signal sending request message to the neighboring cell, where the downlink reference signal sending request message includes first downlink reference signal resource configuration information; and receiving a downlink reference signal sending response from the neighboring cell, where the downlink reference signal sending response includes second downlink reference signal resource configuration information determined based on the first downlink reference signal resource configuration information.

In this application, the serving cell suggests the downlink reference signal resource configuration information to the neighboring cell, to further guide downlink reference signal measurement of the neighboring cell.

With reference to the first aspect, in a possible implementation of the first aspect, the sending a downlink reference signal sending request message to the neighboring cell includes: receiving an authorization message from a location management device, where the authorization message is used to indicate that the serving cell is authorized to indicate to guide the downlink reference signal measurement of the neighboring cell, and the authorization message includes identification information of the neighboring cell; and sending the downlink reference signal sending request message to the neighboring cell based on the authorization message.

It should be understood that the location management device does not necessarily send the authorization message to the serving cell each time the serving cell is required to guide the downlink reference signal measurement of the neighboring cell. For example, a timer may be set in the authorization message. After the authorization message is sent to the serving cell for the first time, before the timer expires, the serving cell is always authorized to guide the downlink reference signal measurement of the neighboring cell.

With reference to the first aspect, in a possible implementation of the first aspect, the authorization message includes information indicating that an authorization state is enabled; and after the downlink reference signal measurement of the neighboring cell is completed, the method further includes: receiving, from the location management device, a message including information indicating that the authorization state is disabled.

In this application, the location management device sends the authorization message, so that the serving cell can be properly managed to guide the downlink reference signal measurement of the neighboring cell.

A second aspect provides a signal transmission method, where the method includes: sending, by a neighboring cell, downlink reference signal resource configuration information to a serving cell; and receiving, from the serving cell, a downlink reference signal measurement result obtained through measurement performed by a terminal device based on the downlink reference signal resource configuration information, and determining beam information based on the downlink reference signal measurement result; or receiving beam information from the serving cell.

It should be understood that, after obtaining the beam information about a beam between the neighboring cell and the terminal device, in an SRS measurement process, the neighboring cell may directly receive, by using the beam information, an SRS sent by the terminal device, to avoid a case in which the neighboring cell sweeps each beam of the terminal device. Therefore, SRS measurement efficiency can be improved. In addition, energy consumption of the neighboring cell can be further reduced.

Therefore, in this application, the serving cell assists the neighboring cell in obtaining the beam information about a beam between the neighboring cell and the terminal device, so that the neighboring cell can measure, by using the beam information, the SRS sent by the terminal device, thereby avoiding a case in which the neighboring cell sweeps each beam of the terminal device. In this way, SRS measurement efficiency can be improved, and energy consumption of the neighboring cell can be further reduced.

With reference to the second aspect, in a possible implementation of the second aspect, the method further includes: measuring, based on the beam information, a sounding reference signal (SRS) sent by the terminal device.

Therefore, in this application, the serving cell assists the neighboring cell in obtaining the beam information about a beam between the neighboring cell and the terminal device, so that the neighboring cell can measure, by using the beam information, the SRS sent by the terminal device, thereby avoiding a case in which the neighboring cell sweeps each beam of the terminal device. In this way, SRS measurement efficiency can be improved, and energy consumption of the neighboring cell can be further reduced.

With reference to the second aspect, in a possible implementation of the second aspect, the sending, by a neighboring cell, downlink reference signal resource configuration information to a serving cell includes: receiving an authorization message from a location management device, where the authorization message is used to indicate that the serving cell is authorized to guide downlink reference signal measurement of the neighboring cell, and the authorization message includes identification information of the serving cell; and sending the downlink reference signal resource configuration information to the serving cell based on the authorization message.

With reference to the second aspect, in a possible implementation of the second aspect, the sending, by a neighboring cell, downlink reference signal resource configuration information to a serving cell includes: receiving a downlink reference signal sending request message from the serving cell, where the downlink reference signal sending request message includes first downlink reference signal resource configuration information; and sending, to the serving cell based on the downlink reference signal sending request message, second downlink reference signal resource configuration information determined based on the first downlink reference signal resource configuration information.

A third aspect provides a signal transmission method, where the method includes: receiving a downlink reference signal measurement request from a serving cell, where the downlink reference signal measurement request includes downlink reference signal resource configuration information of a neighboring cell; measuring, based on the downlink reference signal resource configuration information, a downlink reference signal sent by the neighboring cell, to obtain a downlink reference signal measurement result; and sending the downlink reference signal measurement result to the serving cell.

With reference to the third aspect, in a possible implementation of the third aspect, the method further includes: receiving sounding reference signal (SRS) resource configuration information from the serving cell, where the SRS resource configuration information includes indication information of a time-frequency resource of an SRS and beam information determined based on the downlink reference signal measurement result; and sending the SRS based on the indication information of the time-frequency resource of the SRS and the beam information.

Therefore, in this application, the serving cell assists the neighboring cell in obtaining the beam information about a beam between the neighboring cell and the terminal device, so that the neighboring cell can measure, by using the beam information, the SRS sent by the terminal device, thereby avoiding a case in which the neighboring cell sweeps each beam of the terminal device. In this way, SRS measurement efficiency can be improved, and energy consumption of the neighboring cell can be further reduced.

In some of the foregoing implementations, the downlink reference signal resource configuration information includes information used to indicate a time-frequency resource of a downlink reference signal, and the information used to indicate the time-frequency resource of the downlink reference signal includes any one of the following: an index of an OFDM symbol on which the downlink reference signal is located, an index of an RB on which the downlink reference signal is located, a subcarrier spacing of the downlink reference signal, and a center frequency of the downlink reference signal.

Optionally, in some of the foregoing implementations, the downlink reference signal resource configuration information further includes at least one of the following information: a type of the downlink reference signal, a number of transmissions of the downlink reference signal, and an antenna port number of the downlink reference signal.

According to a fourth aspect, a communication apparatus is provided, where the communication apparatus is configured to perform the method provided in the first aspect, the second aspect, or the third aspect. Optionally, the communication apparatus may include a module configured to perform the method provided in the first aspect, the second aspect, or the third aspect.

According to a fifth aspect, a communication apparatus is provided, where the communication apparatus includes a memory and a processor, the memory is configured to store instructions, the processor is configured to execute the instructions stored in the memory, and execution of the instructions stored in the memory enables the processor to perform the method provided in the first aspect, the second aspect, or the third aspect.

According to a sixth aspect, a chip is provided, where the chip includes a processing module and a communication interface, the processing module is configured to control the communication interface to perform external communication, and the processing module is further configured to implement the method provided in the first aspect, the second aspect, or the third aspect.

According to a seventh aspect, a computer-readable storage medium is provided, where the computer-readable storage medium stores a computer program; and when the computer program is executed by a computer, the computer is enabled to implement the method provided in the first aspect, the second aspect, or the third aspect.

According to an eighth aspect, a computer program product including instructions is provided, where when the instructions are executed by a computer, the computer is enabled to implement the method provided in the first aspect, the second aspect, or the third aspect.

Therefore, in this application, the serving cell assists the neighboring cell in obtaining the beam information about a beam between the neighboring cell and the terminal device, so that the neighboring cell can measure, by using the beam information, the SRS sent by the terminal device, thereby avoiding a case in which the neighboring cell sweeps each beam of the terminal device. In this way, SRS measurement efficiency can be improved, and energy consumption of the neighboring cell can be further reduced.

DESCRIPTION OF EMBODIMENTS

Figure 1:
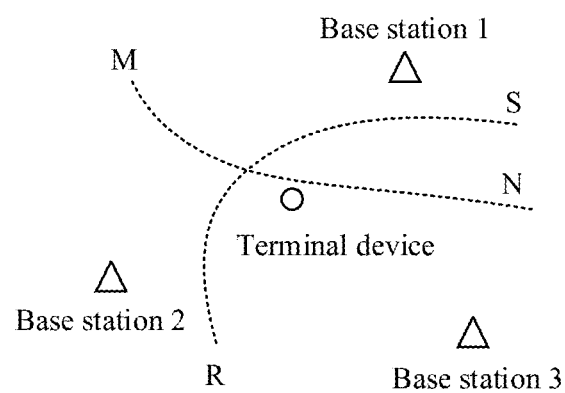
FIG. 1 and FIG. 2 are schematic diagrams of application scenarios according to an embodiment of this application.

The following describes technical solutions of this application with reference to the accompanying drawings.

Unless otherwise defined, all technical and scientific terms used herein have the same meaning as commonly understood by a person skilled in the art to which this application pertains. The terms used in the specification of this application are merely for the purpose of describing specific embodiments, and are not intended to limit this application.

The embodiments of this application may be applied to a beam-based communication system, for example, a 5G system or a new radio (NR) system.

For ease of understanding of the embodiments of this application, the following first describes some terms used in the embodiments of this application.

1. Beam

The beam may be embodied as a spatial domain filter (spatial domain filter), which is also referred to as a spatial filter (spatial filter) or a spatial parameter (spatial parameter), in an NR protocol. A beam used to send a signal may be referred to as a transmit beam (Tx beam), or may be referred to as a spatial domain transmission filter (spatial domain transmission filter) or a spatial domain transmission parameter (spatial domain transmission parameter). A beam used to receive a signal may be referred to as a receive beam (Rx beam), or may be referred to as a spatial domain receive filter (spatial domain receive filter) or a spatial reception parameter (spatial RX parameter).

The transmit beam may refer to distribution of signal strength formed in different directions in space after a signal is transmitted by using an antenna, and the receive beam may refer to distribution of signal strength that is of a radio signal received from an antenna and that is in different directions in space.

In addition, the beam may be a wide beam, a narrow beam, or a beam of another type.

A technology for forming the beam may be a beamforming technology or another technology. The beamforming technology may be specifically a digital beamforming technology, an analog beamforming technology, a hybrid digital/analog beamforming technology, or the like.

The beam usually corresponds to a resource. For example, during beam measurement, a network device measures different beams by using different resources, and a terminal device feeds back measured resource quality, so that the network device knows quality of a corresponding beam. During data transmission, beam information is also indicated by using a resource corresponding to the beam information. For example, the network device indicates information about a physical downlink shared channel (PDSCH) beam of the terminal device by using a transmission configuration indicator (TCI) resource in downlink control information (DCI).

Optionally, a plurality of beams whose communication features are the same or similar may be considered as one beam.

One beam may include one or more antenna ports, to transmit a data channel, a control channel, a sounding signal, and the like. The one or more antenna ports forming the beam may also be considered as one antenna port set.

In the embodiments of this application, unless otherwise specified, the beam is a transmit beam of the network device.

During beam measurement, each beam of the network device corresponds to one resource. Therefore, an index of the resource may be used to uniquely identify the beam corresponding to the resource.

2. Beam Pairing Relationship

The beam pairing relationship represents a pairing relationship between a transmit beam and a receive beam, namely, a pairing relationship between a spatial transmission filter and a spatial reception filter. A relatively large beamforming gain may be obtained by transmitting a signal between the transmit beam and the receive beam that have the beam pairing relationship.

In an implementation, a transmit end and a receive end may obtain the beam pairing relationship through beam training. Specifically, the transmit end may send a reference signal through beam sweeping, and the receive end may also receive a reference signal through beam sweeping. Specifically, the transmit end may form different directional beams in space through beamforming, and may perform polling on a plurality of different directional beams, to transmit a reference signal through the different directional beams, so that a maximum power for transmitting the reference signal in a direction directed by a transmit beam can be reached. The receive end may also form different directional beams in space through beamforming, and may perform polling on a plurality of different directional beams, to receive the reference signal by using the different directional beams, so that a maximum power for receiving the reference signal by the receive end in a direction directed by a receive beam can be reached.

By traversing each transmit beam and each receive beam, the receive end may perform channel measurement based on the received reference signal, and report a measurement result to the transmit end. For example, the receive end may report, to the transmit end, some reference signal resources with relatively high reference signal received powers (RSRP), for example, report identifiers of the reference signal resources, so that the transmit end receives and sends a signal by using a beam pairing relationship with relatively good channel quality during data or signaling transmission.

3. Time Difference of Arrival (TDOA) Positioning Technology

A TDOA positioning principle is to position, by measuring a difference between time at which a radio signal arrives at different monitoring stations, a transmit source that transmits the radio signal. Specifically, a difference between time at which the radio signal arrives at two monitoring stations is calculated, and a distance difference is obtained based on the time difference, to obtain a hyperbola. Two or more hyperbolas may be obtained based on time differences measured by three or more monitoring stations, and the transmit source is positioned based on an intersection point of the two or more hyperbolas.

FIG. 1 is a schematic diagram of an application scenario according to an embodiment of this application. A terminal device in FIG. 1 corresponds to the transmit source that transmits the radio signal in the foregoing TDOA positioning technology, and a base station 1, a base station 2, and a base station 3 in FIG. 1 correspond to the monitoring stations that measure the radio signal in the foregoing TDOA positioning technology. To be specific, the terminal device sends a signal, and the base station 1, the base station 2, and the base station 3 separately detect the signal sent by the terminal device.

For example, a difference between time at which the signal sent by the terminal device arrives at the base station 1 and the base station 2 is $\Delta t1$, and a difference between time at which the signal sent by the terminal device arrives at the base station 2 and the base station 3 is $\Delta t2$. A distance difference L1 is obtained by multiplying the time difference $\Delta t1$ by an electromagnetic wave speed, and a distance difference L2 is obtained by multiplying the time difference $\Delta t2$ by the electromagnetic wave speed. A hyperbola MN shown in FIG. 1 is obtained based on a functional relationship among a location of the base station 1, a location of the base station 2, and the distance difference L1. A hyperbola RS shown in FIG. 1 is obtained based on a functional relationship among the location of the base station 2, a location of the base station 3, and the distance difference L2. The terminal device may be positioned based on an intersection point of the hyperbola MN and the hyperbola RS, as shown in FIG. 1.

In FIG. 1, one of the base station 1, the base station 2, and the base station 3 is a serving base station of the terminal device, and the other two base stations are neighboring base stations of the terminal device.

The serving base station of the terminal device is a base station that currently provides a communication connection service for the terminal device. The neighboring base station of the terminal device is a base station neighboring to the serving base station. In other words, the serving base station is a base station of a serving cell of the terminal device. The neighboring base station is a base station of a neighboring cell of the serving cell of the terminal device.

It should be noted that, in FIG. 1, the three base stations are used to position the terminal device. However, this is not limited in this application. During actual application, more than three base stations may be used to position the terminal device.

4. Angle of Arrival (AOA) Positioning Technology

A positioning principle of the AOA positioning technology is that, a direction line from a transmit source that transmits a radio signal to a monitoring station may be formed by measuring an angle of arrival of the radio signal that arrives at the monitoring station, two or more direction lines may be formed by using angles of arrival measured by two or more monitoring stations, and the transmit source can be positioned based on an intersection point of the two or more direction lines.

Figure 2:
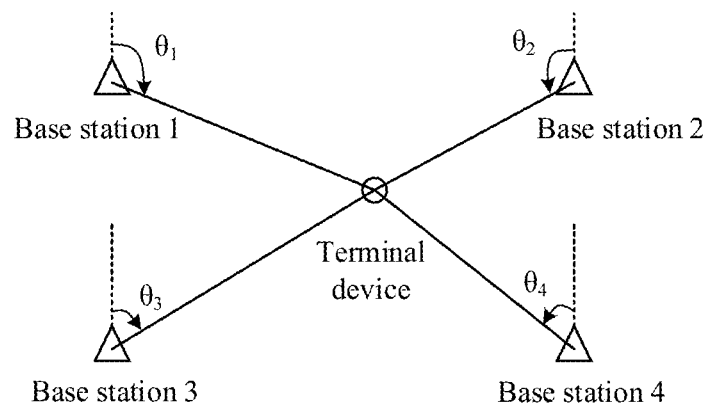

FIG. 2 is a schematic diagram of another application scenario according to an embodiment of this application. A terminal device in FIG. 2 corresponds to the transmit source that transmits the radio signal in the AOA positioning technology, and a base station 1 to a base station 4 in FIG. 2 correspond to the monitoring stations that measure the radio signal in the AOA positioning technology. To be specific, the terminal device sends a signal, and the base station 1 to the base station 4 separately detect an angle of arrival of the signal sent by the terminal device.

For example, as shown in FIG. 2, an angle of arrival, measured by the base station 1, of the signal that is sent by the terminal device and that arrives at the base station 1 is θ1, an angle of arrival, measured by the base station 2, of the signal that is sent by the terminal device and that arrives at the base station 2 is θ2, an angle of arrival, measured by the base station 3, of the signal that is sent by the terminal device and that arrives at the base station 3 is θ3, and an angle of arrival, measured by the base station 4, of the signal that is sent by the terminal device and that arrives at the base station 4 is θ4. Four direction lines may be formed based on the angles of arrival θ1 to θ4 respectively, and the terminal device may be positioned based on an intersection point of the four direction lines, as shown in FIG. 2.

The positioning solution shown in FIG. 2 may be referred to as a multi-base-station AOA positioning solution.

In FIG. 2, one of the base station 1 to the base station 4 is a serving base station of the terminal device, and the other three base stations are neighboring base stations of the terminal device.

As described above, in a 5G system or an NR system, the terminal device may send a signal by using a plurality of beams. If the positioning solution shown in FIG. 1 or FIG. 2 is performed in the 5G or NR system, the terminal device may send a signal by using a plurality of different beams. It should be understood that, assuming that the terminal device sends a signal by using a beam 1, a receive end can detect the signal sent by the terminal device only when performing detection by using a beam that is paired with the beam 1. The beam paired with the beam 1 is a beam that has a beam pairing relationship (as described above) with the beam 1.

The serving base station of the terminal device may obtain, in a beam measurement process, beams (for example, beams that have a beam pairing relationship) for signal transmission between the terminal device and the serving base station. However, no communication connection is established between the neighboring base station and the terminal device. Therefore, the neighboring base station does not know beam-related information of the terminal device.

Currently, when the positioning solution shown in FIG. 1 or FIG. 2 is performed in the 5G or NR system, the neighboring base station sweeps each beam of the terminal device to detect the signal sent by the terminal device. However, this greatly increases signal measurement time, and consequently reduces positioning efficiency.

For the foregoing problem, this application provides a signal transmission method and apparatus, to effectively improve measurement efficiency of measuring, by using a neighboring base station, a signal sent by a terminal device in a beam-based communication system.

It should be understood that, in addition to the positioning scenarios shown in FIG. 1 and FIG. 2, this embodiment of this application may be further applied to another positioning scenario in which a neighboring base station needs to measure an uplink reference signal sent by a terminal device.

Figure 3:
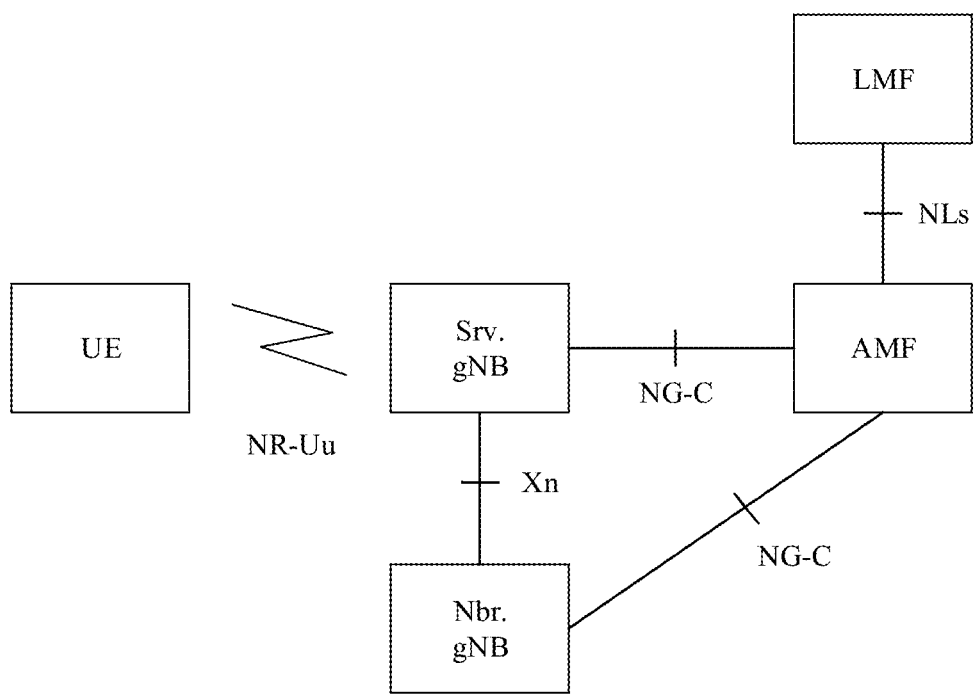
FIG. 3 is a schematic diagram of a communication architecture to which an embodiment of this application is applied.

FIG. 3 is a schematic architectural diagram of a communication architecture to which an embodiment of this application is applied. As shown in FIG. 3, the communication architecture includes a terminal device (represented as UE in FIG. 3), a radio access network, and a core network.

The radio access network includes a serving base station (Srv.gNB) and a neighboring base station (Nbr.gNB). The Srv.gNB may communicate with the Nbr.gNB through a network interface (XnAP) between radio access network nodes. The network interface between the radio access network nodes may be referred to as an Xn interface for short.

The core network includes an access and mobility management function (AMF) and a location management function (LMF).

The radio access network devices Srv.gNB and the Nbr.gNB may communicate with the AMF through an NG-C interface, and the AMF communicates with the LMF through an NLs interface. The AMF may be considered as a router for communication between the radio access network devices Srv.gNB and Nbr.gNB and the LMF.

The terminal device may communicate with the Srv.gNB through NR-Uu.

Optionally, the Srv.gNB may include a location management component (LMC), and the LMC may undertake some LMF functions. In this way, to implement the some LMF functions that can be implemented by the LMC, the radio access network does not need to be introduced into the 5G core network through the AMF. Therefore, a signaling delay can be reduced.

The serving cell in the embodiments of this application indicates a cell on which the terminal device currently camps. The neighboring cell represents a non-serving cell of the terminal device.

In this specification, receiving a message from the serving cell (or the neighboring cell) means receiving the message from a network device in the serving cell (or the neighboring cell). Sending a message to the serving cell (or the neighboring cell) means sending the message to the network device in the serving cell (or the neighboring cell).

The network device in the serving cell (or the neighboring cell) may be a base station or another network-side network element.

In this specification, the serving cell may be replaced with a serving base station, and the neighboring cell may be replaced with a neighboring base station.

The terminal device in the embodiments of this application may include various handheld devices, vehicle-mounted devices, wearable devices, or computing devices that have a wireless communication function, or other processing devices connected to a wireless modem. The terminal device may be a mobile station (MS), a subscriber unit (subscriber unit), a cellular phone (cellular phone), a smartphone (smart phone), a wireless data card, a personal digital assistant (PDA) computer, a tablet computer, a wireless modem (modem), a handset (handset), a laptop computer (laptop computer), a machine type communication (MTC) terminal, or the like.

The network device in the embodiments of this application is an apparatus, deployed in a radio access network, that may provide a wireless communication function for the terminal device. The network device is, for example, a base station. The base station may include a macro base station, a micro base station (also referred to as a small cell), a relay station, an access point, a transmission reception point (TRP), or the like in various forms. The network device may be a network device in a 5G network or an NR network, a network device in a future evolved public land mobile network (PLMN), or the like.

Figure 4:
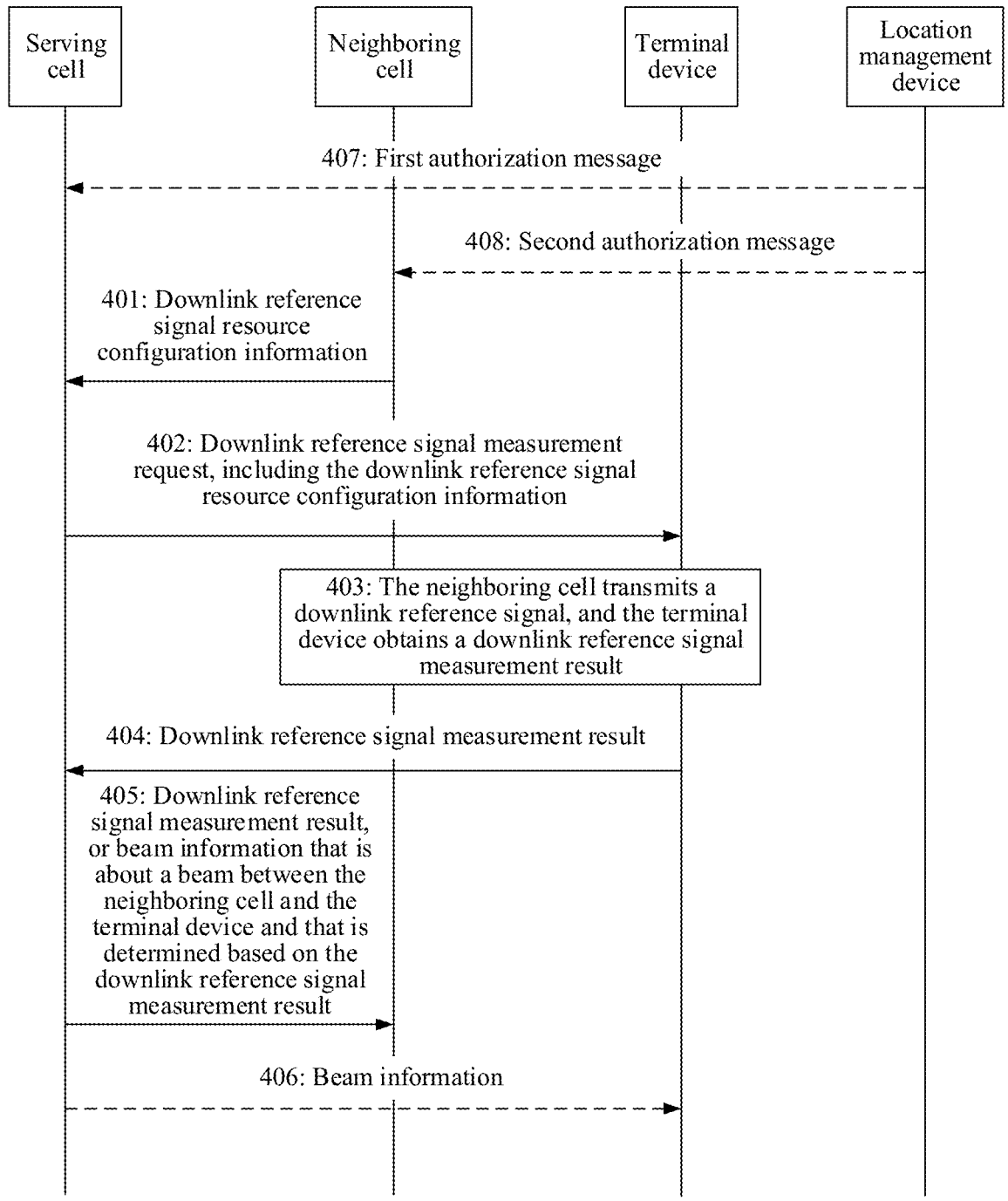
FIG. 4 is a schematic interaction diagram of a signal transmission method according to an embodiment of this application.

FIG. 4 is a schematic interaction diagram of a signal transmission method 400 according to an embodiment of this application. For example, a terminal device in this embodiment corresponds to the UE in FIG. 3, a serving cell in this embodiment of this application corresponds to a cell in which the Srv.gNB in FIG. 3 is located, and a neighboring cell in this embodiment of this application corresponds to a cell in which the Nbr.gNB in FIG. 3 is located. As shown in FIG. 4, the method 400 includes step 401 to step 405.

401: The neighboring cell of the terminal device sends downlink reference signal resource configuration information to the serving cell.

A downlink reference signal may be any one of the following: a channel state information reference signal (CSI-RS), a demodulation reference signal (DMRS), a phase-tracking reference signal (PTRS), a positioning reference signal (PRS), a cell reference signal (CRS), synchronization signal/physical broadcast channel block (SS/PBCH block). The SS/PBCH block may be referred to as an SSB for short.

The downlink reference signal resource configuration information includes information used to indicate a time-frequency resource of the downlink reference signal.

For example, the information used to indicate the time-frequency resource of the downlink reference signal includes any one or more of the following: an index of an orthogonal frequency division multiplexing (OFDM) symbol on which the downlink reference signal is located, an index of a resource block (RB) on which the downlink reference signal is located, a subcarrier spacing of the downlink reference signal, and a center frequency of the downlink reference signal.

Optionally, the downlink reference signal resource configuration information may further include any one or more of the following: a type of the downlink reference signal, a number of transmissions of the downlink reference signal, and an antenna port number of the downlink reference signal.

For example, as shown in Table 1, the downlink reference signal resource configuration information includes reference signal transmission characteristics (Reference Signal Transmission Characteristics), and the reference signal transmission characteristics may include three items: a type (Type) of a reference signal, a number of transmissions (Number of transmissions) of the reference signal, and a time-frequency resource configuration (Time and frequency configuration) of the reference signal.

A configuration manner of the time-frequency resource configuration of the reference signal may be the following manner (1) or manner (2).

Manner (1): an OFDM symbol index and an RB index

Manner (2): When the type of the reference signal is an SS/PBCH block, the time-frequency resource configuration of the reference signal includes a subcarrier spacing of the SS/PBCH block, a center frequency of the SS/PBCH block, and an RB index of the SS/PBCH block.

It should be understood that the configuration manner of the time-frequency resource configuration of the reference signal is not limited to the foregoing manner (1) and manner (2). A resource configuration manner of the reference signal is not limited in this embodiment of this application.

TABLE 1

Content of the downlink reference signal resource configuration information

| Content | Description |
|---|---|
| Reference Signal Transmission Characteristics | Reference signal transmission characteristics |
| >Type | Type of a reference signal |
| >Number of transmissions | Number of transmissions of the reference signal |
| >Time and frequency configuration | Time-frequency resource configuration of the reference signal |

402: The serving cell sends a downlink reference signal measurement request (DL RS request) that includes the downlink reference signal resource configuration information to the terminal device.

The terminal device receives the downlink reference signal measurement request, obtains the downlink reference signal resource configuration information, and further obtains the information about the time-frequency resource used to receive the downlink reference signal.

For example, the serving cell may send the downlink reference signal measurement request to the terminal device through radio resource control (RRC) signaling.

Alternatively, the serving cell may send the downlink reference signal measurement request to the terminal device through other downlink signaling.

403: The neighboring cell transmits the downlink reference signal to the terminal device, and the terminal device obtains a downlink reference signal measurement result.

The neighboring cell sends the downlink reference signal based on the downlink reference signal resource configuration information, and the terminal device measures the downlink reference signal based on the downlink reference signal resource configuration information, to obtain the downlink reference signal measurement result.

For example, the downlink reference signal measurement result includes any one or more of the following: reference signal received power (RSRP) of the downlink reference signal, and reference signal received quality (RSRQ) of the downlink reference signal.

404: The terminal device sends a downlink reference signal measurement response message (DL RS response) to the serving cell, where the downlink reference signal measurement response message includes the downlink reference signal measurement result.

For example, the terminal device reports the downlink reference signal measurement result to the serving cell through radio resource control (RRC) signaling.

405: The serving cell sends, to the neighboring cell, the downlink reference signal measurement result reported by the terminal device, or beam information that is about a beam between the neighboring cell and the terminal device and that is determined based on the downlink reference signal measurement result.

It should be understood that after receiving the downlink reference signal measurement result reported by the terminal device, the serving cell may obtain the beam information about a beam between the neighboring cell and the terminal device based on the downlink reference signal measurement result and the downlink reference signal resource configuration information obtained from the neighboring cell.

For example, the serving cell selects a receive beam of a downlink reference signal with highest reference signal received power (RSRP) in downlink reference signals of the neighboring cell as a receive beam for receiving an SRS by the neighboring cell, and uses the receive beam of the downlink reference signal with the highest RSRP as a transmit beam for sending the SRS by the terminal device.

For another example, the serving cell selects a receive beam of a downlink reference signal with highest reference signal received quality (RSRQ) in downlink reference signals of the neighboring cell as a receive beam for receiving an SRS by the neighboring cell, and uses the receive beam of the downlink reference signal with the highest RSRQ as a transmit beam for sending the SRS by the terminal device.

Optionally, the serving cell may directly send the beam information to the neighboring cell, and the neighboring cell may directly obtain the receive beam for receiving the SRS.

Optionally, the serving cell may alternatively send, to the neighboring cell, the downlink reference signal measurement result reported by the terminal device, and the neighboring cell may obtain the beam information about a beam between the neighboring cell and the terminal device based on the downlink reference signal measurement result and the downlink reference signal resource configuration information.

It should be understood that a manner in which the neighboring cell obtains the beam information should be the same as a manner in which the serving cell obtains the beam information.

In conclusion, in step 405, the neighboring cell may obtain the beam information about a beam between the neighboring cell and the terminal device through information sent by the serving cell.

It should be understood that, after obtaining the beam information about a beam between the neighboring cell and the terminal device, in an SRS measurement process, the neighboring cell may directly receive, by using the beam information, an SRS sent by the terminal device, to avoid a case in which the neighboring cell sweeps each beam of the terminal device. Therefore, SRS measurement efficiency can be improved. In addition, energy consumption of the neighboring cell can be further reduced.

For example, when this embodiment of this application is applied to the positioning solution in FIG. 1 or FIG. 2, SRS measurement efficiency can be improved. Therefore, positioning efficiency of the terminal device can be improved.

Therefore, in this application, the serving cell assists the neighboring cell in obtaining the beam information about a beam between the neighboring cell and the terminal device, so that the neighboring cell can measure, by using the beam information, the SRS sent by the terminal device, thereby avoiding a case in which the neighboring cell sweeps each beam of the terminal device. In this way, SRS measurement efficiency can be improved, and energy consumption of the neighboring cell can be further reduced.

Optionally, as shown in FIG. 4, the method 400 may further include step 406.

406: The serving cell sends the beam information about a beam between the neighboring cell and the terminal device to the terminal device.

The terminal device may obtain, based on the beam information, the transmit beam for sending the SRS.

Optionally, in an implementation of step 406, the serving cell sends an SRS request message to the terminal device, where the SRS request message includes SRS resource configuration information, and further includes the beam information.

It should be understood that the beam information and the SRS resource configuration information are delivered through one piece of signaling, so that signaling overheads can be reduced.

Optionally, in another implementation of step 406, the serving cell sends the beam information to the terminal device through a first downlink message. The first downlink message may be new downlink signaling compared with that in an existing protocol.

It should be further understood that the serving cell should deliver the beam information to the terminal device before the terminal device sends the SRS.

Optionally, in some embodiments, the terminal device may alternatively determine, based on the downlink reference signal measurement result, the transmit beam for sending the SRS.

In this embodiment, both the terminal device and the neighboring cell obtain the beam information, the terminal device may send the SRS based on the beam information, and the neighboring cell also receives the SRS based on the beam information, so that SRS receiving efficiency can be improved, thereby improving SRS measurement efficiency.

For example, in the communication architecture shown in FIG. 3, the terminal device in this embodiment of this application may be the UE shown in FIG. 3, and the serving cell in this embodiment of this application may be a cell in which the Srv.gNB shown in FIG. 3 is located, the neighboring cell in this embodiment of this application may be a cell in which the Nbr.gNB shown in FIG. 3 is located. In this communication architecture, the serving cell may communicate with the neighboring cell through an Xn interface, and the UE may communicate with the serving cell or the neighboring cell through an Nr-Uu interface.

It should be understood that the neighboring cell directly communicates with the serving cell through the Xn interface. In this way, communication efficiency can be improved.

It should be further understood that the neighboring cell may alternatively indirectly communicate with the serving cell through a location management device.

Optionally, in some embodiments, step 401 includes step (a) and step (b).

Step (a): The serving cell sends a downlink reference signal sending request message (DL RS request) to the neighboring cell.

Step (b): The neighboring cell sends a response message (DL RS response) to the serving cell, where the response message carries the downlink reference signal resource configuration information.

Optionally, the serving cell may suggest the downlink reference signal resource configuration information to the neighboring cell through the downlink reference signal sending request message. For example, the downlink reference signal sending request message sent by the serving cell in step (a) includes first downlink reference signal resource configuration information. In this case, the downlink reference signal resource configuration information sent by the neighboring cell to the serving cell in step (b) is second downlink reference signal resource configuration information determined based on the first downlink reference signal resource configuration information.

For example, as shown in Table 2, the downlink reference signal sending request message includes requested reference signal transmission characteristics (Requested Reference Signal Transmission Characteristics), and the requested reference signal transmission characteristics may include three items: a type (Type) of a reference signal, a number of transmissions (Number of transmissions) of the reference signal, and a time-frequency resource configuration (Time and frequency configuration) of the reference signal.

A configuration manner of the time-frequency resource configuration of the reference signal may be the following manner (1) or manner (2).

Manner (1): an OFDM symbol index and an RB index

Manner (2): When the type of the reference signal is an SS/PBCH block, the time-frequency resource configuration of the reference signal includes a subcarrier spacing of the SS/PBCH block, a center frequency of the SS/PBCH block, and an RB index of the SS/PBCH block.

It should be understood that the configuration manner of the time-frequency resource configuration of the reference signal is not limited to the foregoing manner (1) and manner (2). A resource configuration manner of the reference signal is not limited in this embodiment of this application.

The downlink reference signal sending request message further includes UE information (UE information). The UE information may indicate an estimated location or a cell portion identifier (Cell Portion ID) that are of a to-be-positioned terminal device.

The downlink reference signal sending request message may further include a pathloss information request (Pathloss information request). The pathloss information request may be used to request to measure a path loss.

TABLE 2

Content in the downlink reference signal sending request message

| Content | Description |
|---|---|
| Requested Reference Signal Transmission Characteristics | Requested reference signal transmission characteristics |
| >Type | Type of a reference signal |
| >Number of transmissions | Number of transmissions of the reference signal |
| >Time and frequency configuration | Time-frequency resource configuration of the reference signal |
| UE information | UE information |
| Pathloss information request | Pathloss information request |

The second downlink reference signal resource configuration information may be a subset or a universal set of the first downlink reference signal resource configuration information.

In this embodiment, the serving cell suggests the downlink reference signal resource configuration information to the neighboring cell, to further guide downlink reference signal measurement of the neighboring cell.

It should be understood that, in some embodiments, the second downlink reference signal resource configuration information may alternatively be different from the first downlink reference signal resource configuration information.

Optionally, in some embodiments, the neighboring cell may alternatively send the downlink reference signal resource configuration information to the serving cell according to a preset rule without a request of the serving cell.

Optionally, in some embodiments, a location management device may authorize the serving cell to guide the downlink reference signal measurement of the neighboring cell.

As shown in FIG. 4, optionally, in some embodiments, the method 400 further includes the following steps.

Step 407: The location management device sends a first authorization message to the serving cell, where the first authorization message is used to indicate that the serving cell is authorized to guide the downlink reference signal measurement of the neighboring cell, and the first authorization message includes identification information of the neighboring cell.

Optionally, the first authorization message includes a cell list, and the cell list includes identification information of a plurality of neighboring cells.

For example, in a scenario in which one serving cell and a plurality of neighboring cells are used to position the terminal device, the location management device may send an authorization message including the cell list of the plurality of neighboring cells to the serving cell, to represent that the serving cell is authorized to guide downlink reference signal measurement of the plurality of neighboring cells.

For example, the location management device sends the first authorization message to the serving cell by using an NRPPa protocol.

Step 408: The location management device sends a second authorization message to the neighboring cell, where the second authorization message is used to indicate that the serving cell is authorized to guide the downlink reference signal measurement of the neighboring cell, and the second authorization message includes identification information of the serving cell.

For example, the location management device sends the second authorization message to the neighboring cell by using the NRPPa protocol.

In this embodiment, step 401 is performed after step 407 and step 408.

It should be understood that the location management device does not necessarily send the authorization message to the serving cell and the neighboring cell each time the serving cell is required to guide the downlink reference signal measurement of the neighboring cell. For example, a timer may be set in the authorization message. After the authorization message is sent to the serving cell for the first time, before the timer expires, the serving cell is always authorized to guide the downlink reference signal measurement of the neighboring cell. For another example, a timer may be set in the authorization message. After the authorization message is sent to the neighboring cell for the first time, before the timer expires, the neighboring cell always considers by default that the serving cell guides the downlink reference signal measurement of the neighboring cell. For example, before the timer expires, the neighboring cell sends the downlink reference signal resource configuration information to the serving cell at a specific time interval.

The location management device represents a network element that can manage the serving cell and the neighboring cell. The location management device may be a part of the core network or integrated into an access network device. For example, the location management device may be the LMF in the core network shown in FIG. 3, or may be the LMC in the Srv.gNB. The location management device may also be referred to as a location center. A name of the location management device is not limited in this application. In a future evolution technology, the location management device may be given a different name.

Optionally, in some embodiments, the location management device may send the authorization message indicating that the serving cell is authorized to guide the downlink reference signal measurement of the neighboring cell only to the neighboring cell, but does not send the authorization message to the serving cell. That is, step 407 shown in FIG. 4 is not performed.

The neighboring cell sends the downlink reference signal resource configuration information to the serving cell based on the authorization message.

Optionally, in some embodiments, the location management device may send the authorization message indicating that the serving cell is authorized to guide the downlink reference signal measurement of the neighboring cell only to the serving cell, but does not send the authorization message to the neighboring cell. That is, step 408 shown in FIG. 4 is not performed.

In this embodiment, step 401 includes step (a) and step (b) described above, to be specific, the serving cell sends the downlink reference signal sending request message to the neighboring cell based on the authorization message, and the neighboring cell sends the downlink reference signal resource configuration information to the serving cell based on the downlink reference signal sending request message.

Optionally, in some embodiments involving the authorization message, the authorization message sent by the location management device to the serving cell (or the neighboring cell) includes information indicating that an authorization state is enabled. In this case, the method 400 further includes: The location management device further sends a message including information indicating that the authorization state is disabled to the serving cell (or the neighboring cell).

It should be understood that the location management device should send the message including the information indicating that the authorization state is disabled to the serving cell (or the neighboring cell) after the downlink reference signal measurement of the neighboring cell is completed.

An example in which the location management device sends the first authorization message to the serving cell is used. The first authorization message includes the information indicating that the authorization state is enabled. After the downlink reference signal measurement of the neighboring cell is completed, the location management device further sends, to the serving cell, a first message including the information indicating that the authorization state is disabled.

The first message and the first authorization message may be two different messages.

Alternatively, the first message and the first authorization message may be two types of messages used when values of status information of a same message are different.

For example, the authorization message includes an authorization status bit, and the authorization status bit may have two values. One value indicates that the authorization state is enabled, and the other value indicates that the authorization state is disabled. For example, a value of the authorization status bit may be TRUE or FALSE, where TRUE indicates that the authorization state is enabled, and FALSE indicates that the authorization state is disabled.

Optionally, in some embodiments, in step 407, the location management device sends the first authorization message to the serving cell, where the first authorization message includes the status bit information, and the status bit information indicates that the authorization state is enabled. After the downlink reference signal measurement of the neighboring cell is completed, the method further includes: The location management device sends the first authorization message to the serving cell again. In this case, the status bit information in the first authorization message indicates that the authorization state is disabled.

Optionally, in some embodiments, in step 408, the location management device sends the second authorization message to the neighboring cell, where the second authorization message includes the status bit information, and the status bit information indicates that the authorization state is enabled. After the downlink reference signal measurement of the neighboring cell is completed, the method further includes: The location management device sends the second authorization message to the neighboring cell again. In this case, the status bit information in the second authorization message indicates that the authorization state is disabled.

For example, as shown in Table 3, the first authorization message includes an authorization information request (Authorization information request) and a neighboring cell list (Neighbor Cell List).

The authorization information request may include two items: a cell identifier (Cell ID) and a statement (Statement). The cell identifier represents an identifier of the serving cell. The identifier of the serving cell includes, but is not limited to, a global cell identifier (Global Cell ID) or a physical cell identifier (Physical Cell ID). The statement has two values: True and False. True represents that the authorization state is enabled, and False represents that the authorization state is disabled.

The neighboring cell list includes identification information of a neighboring cell that participates in positioning. An identifier of the neighboring cell includes, but is not limited to, a global cell identifier (Global Cell ID) or a physical cell identifier (Physical Cell ID).

TABLE 3

Content of the authorization message sent to the serving cell

| Content | Description |
| --- | --- |
| Authorization information request | Authorization information request |
| >Cell ID | Cell identifier |
| >Statement (True or False) | Statement (used to represent whether the authorization state is enabled or disabled) |
| Neighbor Cell List | Neighboring cell list |

For example, as shown in Table 4, the second authorization message includes an authorization information request (Authorization information request).

The authorization information request may include two items: a cell identifier (Cell ID) and a statement (Statement). The cell identifier represents an identifier of the serving cell. The identifier of the serving cell includes, but is not limited to, a global cell identifier (Global Cell ID) or a physical cell identifier (Physical Cell ID). The statement has two values: True and False. True represents that the authorization state is enabled, and False represents that the authorization state is disabled.

Optionally, as shown in Table 4, the second authorization message may further include requested reference signal transmission characteristics (Requested Reference Signal Transmission Characteristics).

The requested reference signal sending characteristics may include two items: a type (Type) of a reference signal and a number of transmissions (Number of transmissions) of the reference signal.

The second authorization message includes the requested reference signal sending characteristics, so that the location management device can suggest the downlink reference signal resource configuration information to the neighboring cell.

TABLE 4

Content of the authorization message sent to the neighboring cell

| Content | Description |
| --- | --- |
| Authorization information request | Authorization information request |
| >Cell ID | Cell identifier |
| >Statement | Statement (used to represent whether the authorization state is enabled or disabled) |
| Requested Reference Signal Transmission Characteristics | Requested reference signal transmission characteristics |
| >Type | Type of a reference signal |
| >Number of transmissions | Number of transmissions of the reference signal |

In this application, the location management device sends the authorization message, so that the serving cell can be properly managed to guide the downlink reference signal measurement of the neighboring cell.

Optionally, in some embodiments, the location management device may alternatively suggest the downlink reference signal resource configuration information to the serving cell or the neighboring cell through the authorization message, that is, the authorization message may alternatively carry the downlink reference signal resource configuration information.

Based on the foregoing descriptions, in this application, the serving cell assists the neighboring cell in obtaining the beam information about a beam between the neighboring cell and the terminal device, so that the neighboring cell can measure, by using the beam information, the SRS sent by the terminal device, thereby avoiding a case in which each beam of the terminal device is swept before the SRS is measured. In this way, SRS measurement efficiency can be improved, and energy consumption of the neighboring cell can be further reduced.

It should be understood that this embodiment of this application may be applied to a terminal device positioning scenario in a 5G system, for example, a scenario in which UTDOA positioning or AOA positioning is implemented in the 5G system.

Figure 5:
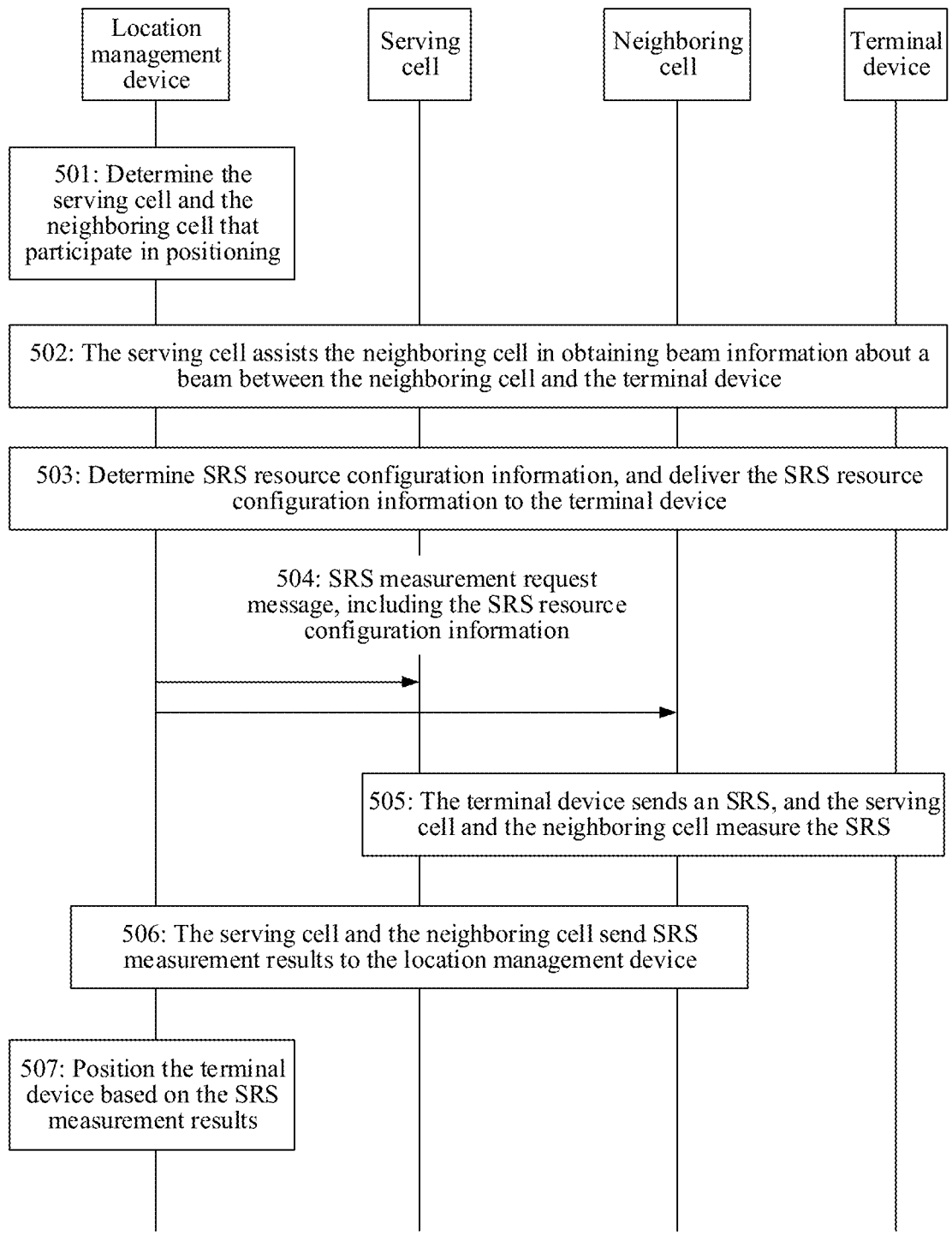
FIG. 5 is another schematic interaction diagram of a signal transmission method according to an embodiment of this application.

FIG. 5 is an interaction flowchart of a technical solution applied to a terminal device positioning scenario according to an embodiment of this application. For example, a terminal device in this embodiment corresponds to the UE in FIG. 3, a serving cell in this embodiment of this application corresponds to a cell in which the Srv.gNB in FIG. 3 is located, and a neighboring cell in this embodiment of this application corresponds to a cell in which the Nbr.gNB in FIG. 3 is located. A location management device in this embodiment of this application corresponds to the LMF in FIG. 3 or the LMC (not shown in FIG. 3) located in the Srv.gNB. As shown in FIG. 5, the following steps are included.

501: The location management device determines a neighboring cell that participates in positioning.

The neighboring cell that participates in the positioning may be one neighboring cell or a plurality of neighboring cells.

It should be understood that if there are a plurality of neighboring cells that participate in the positioning and that are determined by the location management device, neighboring cell-related descriptions in the following are applicable to each of the plurality of neighboring cells.

502: The serving cell assists the neighboring cell in obtaining beam information about a beam between the neighboring cell and the terminal device.

Step 502 may be implemented by using various methods for obtaining beam information by the neighboring cell described in the foregoing embodiment. For details, refer to the foregoing descriptions. For brevity, details are not described herein again.

503: Determine SRS resource configuration information, and deliver the SRS resource configuration information to the terminal device.

Optionally, in an implementation, the serving cell determines the SRS resource configuration information.

In this implementation, for example, step 503 includes step (A1) to step (A4) in the following.

(A1): The location management device sends an SRS resource request message (information request) to the serving cell, to request the serving cell to configure an SRS resource.

In other words, the location management device sends the SRS resource request message to the serving cell, to trigger the terminal device to periodically report an SRS.

Optionally, the SRS resource request message may include a requirement for SRS transmission.

(A2): The serving cell allocates the SRS resource to the terminal device, and generates the SRS resource configuration information.

The SRS resource configuration information may include resource configuration information of one or more SRSs.

Resource configuration information of each SRS includes information used to indicate an SRS resource.

For example, the resource configuration information of each SRS includes some or all of the following information: a quantity of ports of the SRS resource; a PT-RS port number associated with the SRS resource; a comb configuration of the SRS resource and a cyclic shift of an SRS sequence; a start symbol, a quantity of consecutive symbols, and a repetition factor that are of the SRS resource; a start RB of the SRS resource; a frequency hopping configuration of the SRS resource, including an SRS bandwidth; group hopping and sequence hopping of the SRS sequence; a periodic configuration of the SRS resource, where for a periodic SRS and a semi-persistent SRS, a periodicity and an offset in the periodicity are further included; a sequence ID of the SRS resource; and spatial relationship information of the SRS resource.

(A3): The serving cell sends a response message to the location management device, where the response message includes the SRS resource configuration information.

The response message may further include other information related to an SRS resource configuration.

(A4): The serving cell sends an SRS request message to the terminal device, where the SRS request message includes the SRS resource configuration information and beam related information of the SRS (srs-SpatialRelationlnfo), and the beam related information of the SRS represents the beam information determined in step 502.

For example, the serving cell sends the SRS request message to the terminal device through RRC signaling.

There is no limitation on a sequence between step (A3) and step (A4).

Optionally, in another implementation, the location management device determines the SRS resource configuration information.

In this implementation, for example, step 503 may include the following steps.

(B1): The location management device sends an SRS resource request message (information request) to the serving cell and the neighboring cell, to request an SRS resource.

(B2): The serving cell and the neighboring cell separately send SRS resource configuration information to the location management device.

The SRS resource configuration information sent by each cell may include resource configuration information of one or more SRSs.

Resource configuration information of each SRS includes information used to indicate an SRS resource.

For example, the resource configuration information of each SRS includes some or all of the following information: a quantity of ports of the SRS resource;
  a PT-RS port number associated with the SRS resource; a comb configuration of the SRS resource and a cyclic shift of an SRS sequence; a start symbol, a quantity of consecutive symbols, and a repetition factor that are of the SRS resource; a start RB of the SRS resource; a frequency hopping configuration of the SRS resource, including an SRS bandwidth; group hopping and sequence hopping of the SRS sequence; a periodic configuration of the SRS resource, where for a periodic SRS and a semi-persistent SRS, a periodicity and an offset in the periodicity are further included; a sequence ID of the SRS resource; and spatial relationship information of the SRS resource.

(B3): The location management device determines, based on the SRS resource configuration information reported by the serving cell and the neighboring cell, SRS resource configuration information (denoted as first SRS resource configuration information) to be delivered to the terminal device.

It should be understood that the location management device comprehensively considers the SRS resource configuration information reported by the serving cell and the neighboring cell, and decides the SRS resource configuration information to be delivered to the terminal device. This helps implement interference coordination between cells, and further helps prevent a sending task of the terminal device from exceeding a sending capability of the terminal device. In other words, this can prevent the terminal device from sending, at a same moment, a plurality of SRS resources that exceed the capability of the terminal device.

(B4): The location management device sends the first SRS resource configuration information to the terminal device.

Optionally, the location management device sends an SRS request message to the terminal device by using an LPP/NPP protocol, where the SRS request message includes the first SRS resource configuration information and beam related information of the SRS (srs-SpatialRelationlnfo), and the beam related information of the SRS represents the beam information determined in step 502.

Optionally, the location management device sends the first SRS resource configuration information to the terminal device through the serving cell.

For example, the location management device sends the first SRS resource configuration information to the serving cell, and the serving cell sends the SRS request message to the terminal device, where the SRS request message includes the first SRS resource configuration information and the beam related information of the SRS (srs-SpatialRelationlnfo), and the beam related information of the SRS represents the beam information determined in step 502.

504: The location management device sends the SRS resource configuration information determined in step 503 to the serving cell and the neighboring cell.

For example, the location management device sends an SRS measurement request message to the serving cell and the neighboring cell, where the SRS measurement request includes the SRS resource configuration information.

Optionally, the location management device may alternatively send a positioning request to the serving cell and the neighboring cell, where the positioning request may include duration, to indicate the serving cell and the neighboring cell to perform SRS measurement after the duration.

505: The terminal device sends the SRS, and the serving cell and the neighboring cell measure the SRS.

The terminal device determines the SRS resource based on the SRS resource configuration information received in step 503, and obtains, based on the beam information, a transmit beam for sending the SRS resource. The terminal device sends the SRS by using the transmit beam based on the SRS resource.

The neighboring cell determines the SRS resource based on the SRS resource configuration information, and obtains, based on the beam information, a receive beam for receiving the SRS resource. The neighboring cell receives the SRS by using the receive beam based on the SRS resource.

506: The serving cell and the neighboring cell send SRS measurement results to the location management device.

507: Position the terminal device based on the SRS measurement results.

The SRS may be used in manners such as an uplink time difference of arrival (UTDOA) positioning method, an uplink angle of arrival (UAOA) positioning method, an enhanced cell identifier (ECID) positioning method, and a multi-cell round trip time (Multi-RTT) positioning method.

In the UTDOA positioning manner, a terminal device sends an SRS, a base station (including a serving cell and a neighboring cell) receives the SRS and measures an uplink time difference of arrival of the SRS, and a location center determines a location of the terminal device based on time differences of arrival obtained when the SRS is received by different base stations.

In the UAOA positioning manner, a terminal device sends an SRS, a base station (including a serving cell and a neighboring cell) receives the SRS and measures an uplink angle of arrival of the SRS, and a location center determines a location of the terminal device based on angles of arrival obtained when the SRS is received by different base stations.

In the ECID positioning manner, a terminal device measures a terminal device receive-transmit time difference (UE Rx-Tx time difference) of a serving cell, and a base station measures an eNB/gNB receive-transmit time difference (eNB/gNB Rx-Tx time difference) of the terminal device based on an uplink signal/channel, for example, an SRS. A location center calculates an RTT based on the terminal device receive-transmit time difference and the eNB/gNB receive-transmit time difference, determines a distance between UE and the base station, and determines a location of the terminal device with reference to an uplink angle of arrival obtained based on an uplink signal/channel, for example, an SRS.

In the multi-RTT positioning manner, a network side obtains RTTs between a terminal device and a plurality of cells in a manner similar to an RTT obtaining manner in the ECID positioning manner, to determine a location of the terminal device.

Optionally, in the embodiment shown in FIG. 5, the SRS measurement request sent by the location management device to the neighboring cell and the serving cell includes a measurement type, and the measurement type includes any one or more of the following: SRS receiving time information (corresponding to the UTDOA positioning manner), SRS receiving angle information (corresponding to the UAOA positioning manner), and an SRS-based receive-transmit time difference (which may correspond to the ECID positioning manner or the multi-RTT positioning manner).

Correspondingly, when the measurement type is the SRS receiving time information, the SRS measurement result sent by the serving cell and the neighboring cell to the location management device includes the SRS receiving time information, for example, an RTOA.

When the measurement type is the SRS receiving angle information, the SRS measurement result sent by the serving cell and the neighboring cell to the location management device includes the SRS receiving angle information, for example, an angle of arrival in a horizontal direction and an angle of arrival in a vertical direction that are of the SRS.

When the measurement type is the SRS-based receive-transmit time difference, the SRS measurement result sent by the serving cell and the neighboring cell to the location management device includes the SRS-based receive-transmit time difference Rx-Tx time difference, where receive time is SRS uplink frame timing, and transmit time is downlink reference signal downlink frame timing associated with the SRS.

It should be understood that in the embodiment shown in FIG. 5, the SRS measurement request sent by the location management device to the neighboring cell and the serving cell may further include the measurement type, representing that SRS measurement is performed based on a default measurement type.

For example, in the communication architecture shown in FIG. 3, the serving cell and the neighboring cell may communicate with the location management device through the NG-C interface, the serving cell may communicate with the neighboring cell through the Xn interface, and the UE may communicate with the serving cell or the neighboring cell through the Nr-Uu interface.

It can be learned from the foregoing that, compared with the current technology, a procedure in which the terminal device measures the downlink reference signal of the neighboring cell is added in this application, so that a beam measurement process for the neighboring cell and the terminal device can be implemented. In this application, the serving cell may determine the beam information about a beam between the neighboring cell and the terminal device based on the downlink reference signal measurement result reported by the terminal device, or the neighboring cell may determine the beam information about a beam between the neighboring cell and the terminal device based on the downlink reference signal measurement result reported by the terminal device. The beam information includes a transmit beam used by the terminal device to send the SRS and a receive beam used by the neighboring cell to receive the SRS.

Optionally, in some embodiments, the terminal device may alternatively determine, based on the downlink reference signal measurement result, the transmit beam for sending the SRS.

In other words, in this application, beam alignment can be implemented between the neighboring cell and the terminal device, to avoid a case in which the neighboring cell sweeps each beam of the terminal device during SRS measurement, thereby improving SRS measurement efficiency, and further improving positioning efficiency of the terminal device. In addition, energy consumption of the neighboring cell can be further reduced.

In addition, in this application, that the serving cell coordinates, through the Xn interface, sending and selection of a downlink reference signal of the neighboring cell can reduce signaling overheads compared with that the location management device coordinates sending and selection of a downlink reference signal of the neighboring cell.

Therefore, in this application, positioning efficiency of positioning the terminal device in a high frequency band (FR2) in the UTDOA positioning manner, the UAOA positioning manner, the ECID positioning manner, or the multi-RTT positioning manner can be improved.

Optionally, the SRS in this application may be replaced with another uplink signal, and the another uplink signal may be an uplink signal used for positioning the terminal device.

It should be understood that in an existing protocol, an SRS is used for positioning a terminal device. In a future evolution technology, it may be proposed that an uplink signal with another name is used for positioning a terminal device. In this case, the SRS in this embodiment of this application may be replaced with the uplink signal with the another name.

The embodiments described in this specification may be independent solutions, or may be combined according to internal logic. All these solutions fall within the protection scope of this application.

It may be understood that in the foregoing method embodiments, the methods and operations that are implemented by the terminal device may alternatively be implemented by a component (for example, a chip or a circuit) that may be used in the terminal device, and the methods and the operations that are implemented by the network device may alternatively be implemented by a component (for example, a chip or a circuit) that may be used in the network device.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that, to implement the foregoing functions, each network element, such as a transmit end device or a receive end device, includes a corresponding hardware structure and/or software module for performing each function. A person skilled in the art may be aware that with reference to units and algorithm steps in the examples described in the embodiments disclosed in this specification, this application can be implemented by electronic hardware or a combination of computer software and electronic hardware. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, a transmit end device or a receive end device may be divided into function modules based on the foregoing method examples. For example, the transmit end device or the receive end device may be divided into function modules corresponding to functions, or two or more functions may be integrated into one processing module. The integrated module may be implemented in a form of hardware, or may be implemented in a form of a software function module. It should be noted that, in the embodiments of this application, division into the modules is an example, and is merely logical function division. During actual implementation, another division manner may be used. An example in which function modules are obtained through division based on functions is used below for description.

Figure 6:
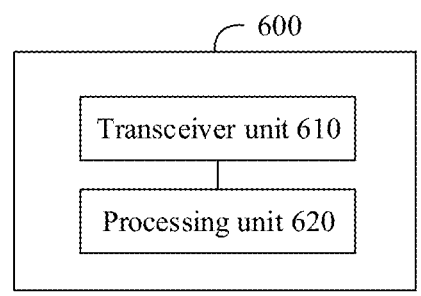
FIG. 6 is a schematic block diagram of a communication device to which an embodiment of this application is applied.

As shown in FIG. 6, an embodiment of this application provides a communication device 600. The communication device 600 includes a transceiver unit 610 and a processing unit 620. The transceiver unit 610 may communicate with the outside, and the processing unit 620 is configured to process data. The transceiver unit 610 may also be referred to as a communication interface or a communication unit.

The communication device 600 may be configured to perform an action performed by the terminal device in the foregoing method embodiments, or an action performed by the serving cell in the foregoing method embodiments, or an action performed by the neighboring cell in the foregoing method embodiments, or an action performed by the location management device in the foregoing method embodiments.

In an implementation, the communication device 600 may be configured to perform the action performed by the serving cell in the foregoing method embodiments. The communication device 600 may be referred to as a network device, for example, a serving base station, in the serving cell.

In this implementation, the transceiver unit 610 is configured to perform receiving and sending operations on the serving cell side in the foregoing method embodiments, and the processing unit 610 is configured to perform a processing operation performed by the serving cell in the foregoing method embodiments.

The transceiver unit 610 is configured to: receive downlink reference signal resource configuration information from a neighboring cell; send, to a terminal device, a downlink reference signal measurement request that includes the downlink reference signal resource configuration information; and receive, from the terminal device, a downlink reference signal measurement result obtained through measurement based on the downlink reference signal resource configuration information.

The processing unit 620 is configured to determine beam information based on the downlink reference signal measurement result.

The transceiver unit 610 is further configured to send the downlink reference signal measurement result or the beam information to the neighboring cell.

Therefore, in this application, the serving cell assists the neighboring cell in obtaining the beam information about a beam between the neighboring cell and the terminal device, so that the neighboring cell can measure, by using the beam information, an SRS sent by the terminal device, thereby avoiding a case in which the neighboring cell sweeps each beam of the terminal device. In this way, SRS measurement efficiency can be improved, and energy consumption of the neighboring cell can be further reduced.

For explanation of the downlink reference signal resource configuration information, refer to the explanation in the foregoing method embodiments. Details are not described herein again.

Optionally, in some embodiments, the transceiver unit 610 is further configured to send the beam information to the terminal device, to indicate the terminal device to send the sounding reference signal (SRS) based on the beam information.

Optionally, in some embodiments, the transceiver unit 610 is configured to send an SRS request message to the terminal device, where the SRS request message includes SRS resource configuration information and the beam information.

Optionally, in some embodiments, the transceiver unit 610 is configured to: send a downlink reference signal sending request message to the neighboring cell, where the downlink reference signal sending request message includes first downlink reference signal resource configuration information, and receive a downlink reference signal sending response from the neighboring cell, where the downlink reference signal sending response includes second downlink reference signal resource configuration information determined based on the first downlink reference signal resource configuration information.

Optionally, in some embodiments, the transceiver unit 610 is configured to: receive an authorization message from a location management device, where the authorization message is used to indicate that the serving cell is authorized to guide downlink reference signal measurement of the neighboring cell, and the authorization message includes identification information of the neighboring cell; and send a downlink reference signal sending request message to the neighboring cell based on the authorization message.

Optionally, in some embodiments, the authorization message includes information indicating that an authorization state is enabled; and after the downlink reference signal measurement of the neighboring cell is completed, the transceiver unit 610 is further configured to receive, from the location management device, a message including information indicating that the authorization state is disabled.

In an implementation, the communication device 600 may be configured to perform the action performed by the neighboring cell in the foregoing method embodiments. The communication device 600 may be referred to as a network device, for example, a neighboring base station, in the neighboring cell.

In this implementation, the transceiver unit 610 is configured to perform receiving and sending operations on the neighboring cell side in the foregoing method embodiments, and the processing unit 610 is configured to perform a processing operation performed by the neighboring cell in the foregoing method embodiments.

The transceiver unit 610 is configured to: send downlink reference signal resource configuration information to a serving cell; and receive, from the serving cell, a downlink reference signal measurement result obtained through measurement performed by a terminal device based on the downlink reference signal resource configuration information.

The processing unit 620 is configured to determine beam information based on the downlink reference signal measurement result.

Alternatively, the transceiver unit 610 is configured to receive beam information from the serving cell.

Therefore, in this application, the serving cell assists the neighboring cell in obtaining the beam information about a beam between the neighboring cell and the terminal device, so that the neighboring cell can measure, by using the beam information, an SRS sent by the terminal device, thereby avoiding a case in which the neighboring cell sweeps each beam of the terminal device. In this way, SRS measurement efficiency can be improved, and energy consumption of the neighboring cell can be further reduced.

For explanation of the downlink reference signal resource configuration information, refer to the explanation in the foregoing method embodiments. Details are not described herein again.

Optionally, in some embodiments, the transceiver unit 610 is configured to receive, based on the beam information, the sounding reference signal (SRS) sent by the terminal device.

Optionally, in some embodiments, the transceiver unit 610 is configured to: receive an authorization message from a location management device, where the authorization message is used to indicate that the serving cell is authorized to guide downlink reference signal measurement of the neighboring cell, and the authorization message includes identification information of the serving cell; and send downlink reference signal resource configuration information to the serving cell based on the authorization message.

Optionally, in some embodiments, the authorization message includes information indicating that an authorization state is enabled; and after the downlink reference signal measurement of the neighboring cell is completed, the transceiver unit 610 is configured to receive, from the location management device, a message including information indicating that the authorization state is disabled.

Optionally, in some embodiments, the transceiver unit 610 is configured to: receive a downlink reference signal sending request message from the serving cell, where the downlink reference signal sending request message includes first downlink reference signal resource configuration information; and send, to the serving cell based on the downlink reference signal sending request message, second downlink reference signal resource configuration information determined based on the first downlink reference signal resource configuration information.

In an implementation, the communication device 600 may be configured to perform the action performed by the terminal device in the foregoing method embodiments. The communication device 600 may be referred to as a terminal device.

In this implementation, the transceiver unit 610 is configured to perform receiving and sending operations on the terminal device side in the foregoing method embodiments, and the processing unit 610 is configured to perform a processing operation performed by the terminal device in the foregoing method embodiments.

The transceiver unit 610 is configured to receive a downlink reference signal measurement request from a serving cell, where the downlink reference signal measurement request includes downlink reference signal resource configuration information of a neighboring cell.

The processing unit 620 is configured to measure, based on the downlink reference signal resource configuration information, a downlink reference signal sent by the neighboring cell, to obtain a downlink reference signal measurement result.

The transceiver unit 610 is further configured to send the downlink reference signal measurement result to the serving cell.

Therefore, in this application, the serving cell assists the neighboring cell in obtaining the beam information about a beam between the neighboring cell and the terminal device, so that the neighboring cell can measure, by using the beam information, an SRS sent by the terminal device, thereby avoiding a case in which the neighboring cell sweeps each beam of the terminal device. In this way, SRS measurement efficiency can be improved, and energy consumption of the neighboring cell can be further reduced.

For explanation of the downlink reference signal resource configuration information, refer to the explanation in the foregoing method embodiments. Details are not described herein again.

Optionally, in some embodiments, the transceiver unit 610 is configured to: receive, from the serving cell, the beam information determined based on the downlink reference signal measurement result; and send the sounding reference signal (SRS) based on the beam information.

For example, an SRS request message is received from the serving cell, where the SRS request message includes SRS resource configuration information and the beam information.

In an implementation, the communication device 600 may be configured to perform the action performed by the location management device in the foregoing method embodiments. The communication device 600 may be referred to as a location management device.

In this implementation, the transceiver unit 610 is configured to perform receiving and sending operations on the location management device side in the foregoing method embodiments, and the processing unit 610 is configured to perform a processing operation performed by the location management device in the foregoing method embodiments.

The processing unit 620 is configured to generate a first authorization message and a second authorization message, where the first authorization message is used to indicate that a serving cell of a terminal device is authorized to guide downlink reference signal measurement of a neighboring cell of the terminal device, the first authorization message includes identification information of the neighboring cell, the second authorization message is used to indicate that the serving cell is authorized to guide the downlink reference signal measurement of the neighboring cell of the terminal device, and the second authorization message includes identification information of the serving cell. The transceiver unit 610 is configured to send the first authorization message to the serving cell, and send the second authorization message to the neighboring cell.

In this application, the location management device sends the authorization message, so that the serving cell can be properly managed to guide the downlink reference signal measurement of the neighboring cell.

Optionally, in some embodiments, the first authorization message includes information indicating that an authorization state is enabled, and the second authorization message includes the information indicating that the authorization state is enabled. The transceiver unit 610 is further configured to separately send a message including information indicating that the authorization state is disabled to the serving cell and the neighboring cell.

It should be understood that the processing unit 620 in the foregoing embodiment may be implemented by a processor or a processor-related circuit, and the transceiver unit 610 may be implemented by a transceiver or a transceiver-related circuit.

Figure 7:
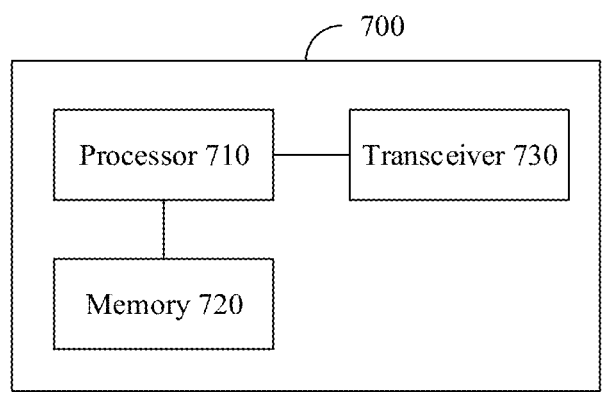
FIG. 7 is another schematic block diagram of a communication device according to an embodiment of this application.

As shown in FIG. 7, an embodiment of this application further provides a communication device 700. The communication device 700 includes a processor 710, a memory 720, and a transceiver 730. The memory 720 stores a program. The processor 710 is configured to execute the program stored in the memory 720. The program stored in the memory 720 is executed, so that the processor 710 is configured to perform related processing steps in the foregoing method embodiments; and the program stored in the memory 720 is executed, so that the processor 710 controls the transceiver 730 to perform related receiving and sending steps in the foregoing method embodiments.

In an implementation, the communication device 700 is configured to perform an action performed by the serving cell in the foregoing method embodiments. In this case, the program stored in the memory 720 is executed, so that the processor 710 is configured to perform processing steps on the serving cell side in the foregoing method embodiments, and the program stored in the memory 720 is executed, so that the processor 710 controls the transceiver 730 to perform receiving and sending steps on the serving cell side in the foregoing method embodiments.

In another implementation, the communication device 700 is configured to perform an action performed by the neighboring cell in the foregoing method embodiments. In this case, the program stored in the memory 720 is executed, so that the processor 710 is configured to perform processing steps on the neighboring cell side in the foregoing method embodiments, and the program stored in the memory 720 is executed, so that the processor 710 controls the transceiver 730 to perform receiving and sending steps on the neighboring cell side in the foregoing method embodiments.

In still another implementation, the communication device 700 is configured to perform an action performed by the terminal device in the foregoing method embodiments. In this case, the program stored in the memory 720 is executed, so that the processor 710 is configured to perform processing steps on the terminal device side in the foregoing method embodiments, and the program stored in the memory 720 is executed, so that the processor 710 controls the transceiver 730 to perform receiving and sending steps on the terminal device side in the foregoing method embodiments.

In still another implementation, the communication device 700 is configured to perform an action performed by the location management device in the foregoing method embodiments. In this case, the program stored in the memory 720 is executed, so that the processor 710 is configured to perform processing steps on the location management device side in the foregoing method embodiments, and the program stored in the memory 720 is executed, so that the processor 710 controls the transceiver 730 to perform receiving and sending steps on the location management device side in the foregoing method embodiments.

Therefore, in this application, the serving cell assists the neighboring cell in obtaining beam information about a beam between the neighboring cell and the terminal device, so that the neighboring cell can measure, by using the beam information, an SRS sent by the terminal device, thereby avoiding a case in which the neighboring cell sweeps each beam of the terminal device. In this way, SRS measurement efficiency can be improved, and energy consumption of the neighboring cell can be further reduced.

An embodiment of this application further provides a communication device 800. The communication device 800 may be a terminal device or a chip. The communication device 800 may be configured to perform an action performed by the terminal device in the foregoing method embodiments.

Figure 8:
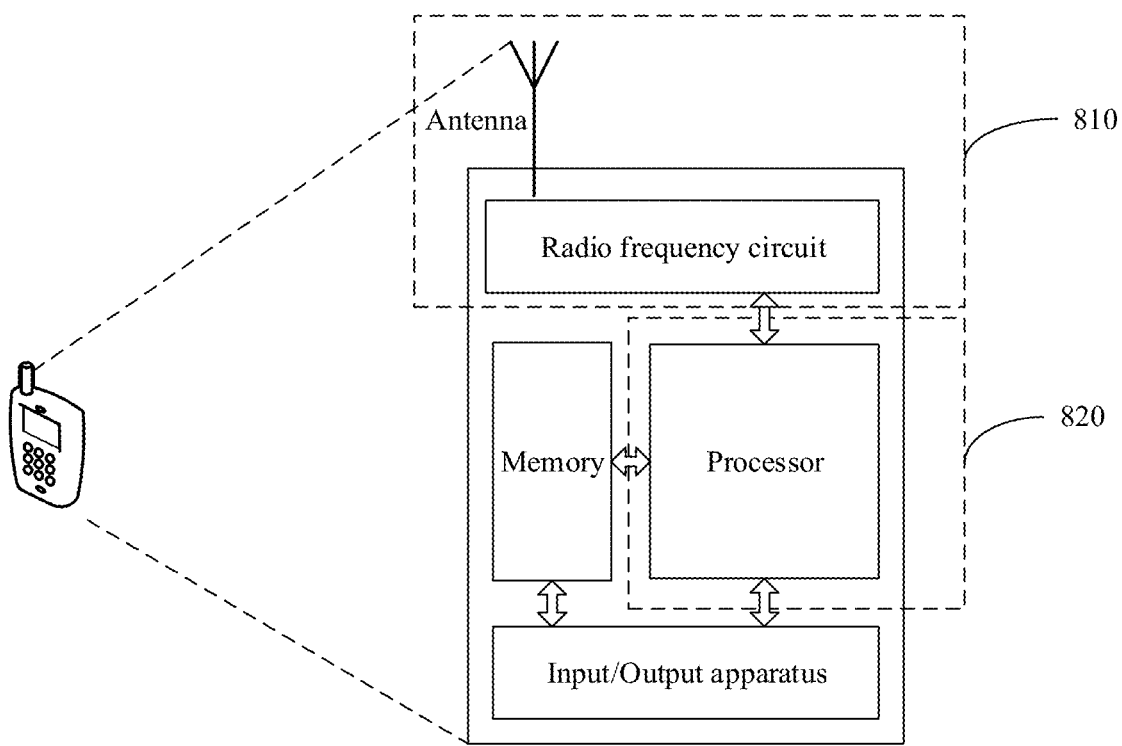
FIG. 8 is a schematic block diagram of a terminal device according to an embodiment of this application.

When the communication device 800 is a terminal device, FIG. 8 is a simplified schematic structural diagram of the terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and data. The radio frequency circuit is mainly configured to perform conversion between a baseband signal and a radio frequency signal, and process the radio frequency signal. The antenna is mainly configured to receive and send a radio frequency signal in an electromagnetic wave form. The input/output apparatus, for example, a touchscreen, a display screen, or a keyboard, is mainly configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 8, the terminal device includes a transceiver unit 810 and a processing unit 820. The transceiver unit 810 may also be referred to as a transceiver, a transceiver machine, a transceiver apparatus, or the like. The processing unit 820 may also be referred to as a processor, a processing board, a processing module, a processing apparatus, and the like. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

For example, in an implementation, the transceiver unit 810 is configured to perform a receiving operation of the terminal device in step 402, a sending operation on the terminal device side in step 404, and a receiving operation on the terminal device side in step 406 in FIG. 4, and/or the transceiver unit 810 is further configured to perform other receiving and sending steps on the terminal device side. The processing unit 820 is configured to perform a processing step on the terminal device side in the embodiments of this application. For example, in step 402, the processing unit 820 is configured to determine, based on the received downlink reference signal resource configuration information, the time-frequency resource for receiving the downlink reference signal. For another example, in step 406, the processing unit 820 is configured to determine, based on the beam information, the transmit beam for sending the SRS.

For another example, in another implementation, the transceiver unit 810 is configured to perform receiving and sending operations on the terminal device side in step 502, a receiving operation on the terminal device side in step 503, and a receiving operation on the terminal device side in step 505 shown in FIG. 5, and/or the transceiver unit 810 is further configured to perform other receiving and sending steps on the terminal device side. The processing unit 820 is configured to perform a processing operation on the terminal device side in step 502 and a processing operation on the terminal device side in step 503 in FIG. 5, for example, obtain, based on the SRS resource configuration information, the resource for sending the SRS, and obtain, based on the beam information, the transmit beam for sending the SRS, and/or the processing unit 820 is further configured to perform other processing steps on the terminal device side in the embodiments of this application.

It should be understood that FIG. 8 is merely an example instead of a limitation. The terminal device including the transceiver unit and the processing unit may not depend on the structure shown in FIG. 8.

When the communication device 800 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of this application further provides a communication device 900. The communication device 900 may be a network device or a chip. The communication device 900 may be configured to perform an action performed by the serving cell or the neighboring cell in the foregoing method embodiments.

Figure 9:
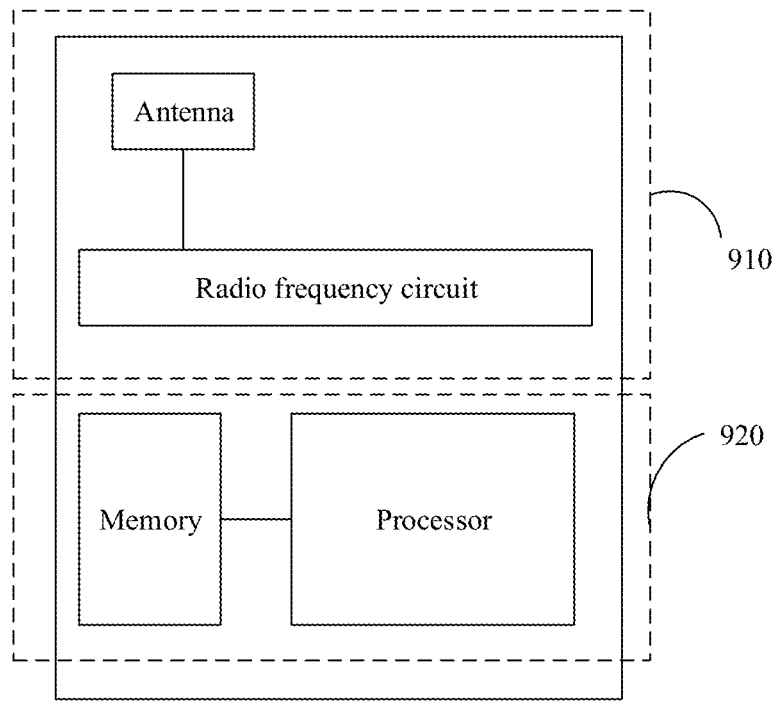
FIG. 9 is a schematic block diagram of a network device according to an embodiment of this application.

When the communication device 900 is a network device, for example, a base station, FIG. 9 is a simplified schematic structural diagram of the base station. The base station includes a part 910 and a part 920. The part 910 is mainly configured to: send and receive a radio frequency signal, and convert the radio frequency signal and a baseband signal. The part 920 is mainly configured to: perform baseband processing, control the base station, and the like. The part 910 may be usually referred to as a transceiver unit, a transceiver machine, a transceiver circuit, a transceiver, or the like. The part 920 is usually a control center of the base station, may usually be referred to as a processing unit, and is configured to control the base station to perform a processing operation on the network device side in the foregoing method embodiments.

The transceiver unit of the part 910 may also be referred to as a transceiver machine, a transceiver, or the like, and includes an antenna and a radio frequency unit. The radio frequency unit is mainly configured to perform radio frequency processing. Optionally, a component that is of the part 910 and that is configured to implement a receiving function may be considered as a receiving unit, and a component that is configured to implement a sending function may be considered as a sending unit. In other words, the part 910 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 920 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

Case 1: The communication device 900 is configured to perform an action performed by the serving cell in the foregoing method embodiments.

For example, in an implementation, the transceiver unit of the part 910 is configured to perform receiving operations on the serving cell side in step 401, step 404, and step 407, and sending operations on the serving cell side in step 402, step 405, and step 406 in FIG. 4, and/or the transceiver unit of the part 910 is further configured to perform other receiving and sending steps on the serving cell side. The processing unit of the part 920 is configured to perform processing steps on the serving cell side in FIG. 4. For example, in step 407, the processing unit of the part 920 is configured to determine, based on the first authorization message, downlink reference signal measurement that is of a neighboring cell or neighboring cells and that needs to be guided. For example, in step 404, the processing unit of the part 920 is configured to determine the beam information about a beam between the neighboring cell and the terminal device based on the downlink reference signal measurement result.

For another example, in another implementation, the transceiver unit of the part 910 is configured to perform receiving operations on the serving cell side in step 502, step 503, step 504, and step 505, and sending operations on the serving cell side in step 502, step 503, and step 506 in FIG. 5, and/or the transceiver unit of the part 910 is further configured to perform other receiving and sending steps on the serving cell side. The processing unit of the part 920 is configured to perform processing steps on the serving cell side in step 502, step 503, and step 505 in FIG. 5.

Case 2: The communication device 900 is configured to perform an action performed by the neighboring cell in the foregoing method embodiments.

For example, in an implementation, the transceiver unit of the part 910 is configured to perform sending operations on the neighboring cell side in step 401 and step 403, and receiving operations on the neighboring cell side in step 405 and step 408 in FIG. 4, and/or the transceiver unit of the part 910 is further configured to perform other receiving and sending steps on the neighboring cell side. The processing unit of the part 920 is configured to perform processing steps on the neighboring cell side in FIG. 4. For example, in step 405, the processing unit of the part 920 is configured to determine, based on information sent by the serving cell, the receive beam for receiving the SRS.

For another example, in another implementation, the transceiver unit of the part 910 is configured to perform receiving operations on the neighboring cell side in step 502, step 503, step 504, and step 505, and sending operations on the neighboring cell side in step 502, step 503, and step 506 in FIG. 5, and/or the transceiver unit of the part 910 is further configured to perform other receiving and sending steps on the neighboring cell side. The processing unit of the part 920 is configured to perform processing steps on the neighboring cell side in step 502, step 503, and step 505 in FIG. 5.

Case 3: The communication device 900 is configured to perform an action performed by the location management device in the foregoing method embodiments.

For example, in an implementation, the transceiver unit of the part 910 is configured to perform sending operations on the location management device side in step 407 and step 408 in FIG. 4, and/or the transceiver unit of the part 910 is further configured to perform other receiving and sending steps on the location management device side. The processing unit of the part 920 is configured to perform processing steps of the location management device in the embodiment shown in FIG. 4. For example, in step 407, the processing unit of the part 920 is configured to generate the first authorization message, and in step 408, the processing unit of the part 920 is configured to generate the second authorization message.

For another example, in another implementation, the transceiver unit of the part 910 is configured to perform sending operations on the location management device side in step 502, step 503, and step 504, and a receiving operation on the location management device side in step 506 in FIG. 5, and/or the transceiver unit of the part 910 is further configured to perform other receiving and sending steps on the location management device side. The processing unit of the part 920 is configured to perform processing steps in step 501, step 502, step 503, and step 507 in FIG. 5.

It should be understood that FIG. 9 is merely an example instead of a limitation. The network device including the transceiver unit and the processing unit may not depend on the structure shown in FIG. 9.

When the communication device 900 is a chip, the chip includes a transceiver unit and a processing unit. The transceiver unit may be an input/output circuit or a communication interface. The processing unit may be a processor, a microprocessor, or an integrated circuit, integrated on the chip.

Figure 10:
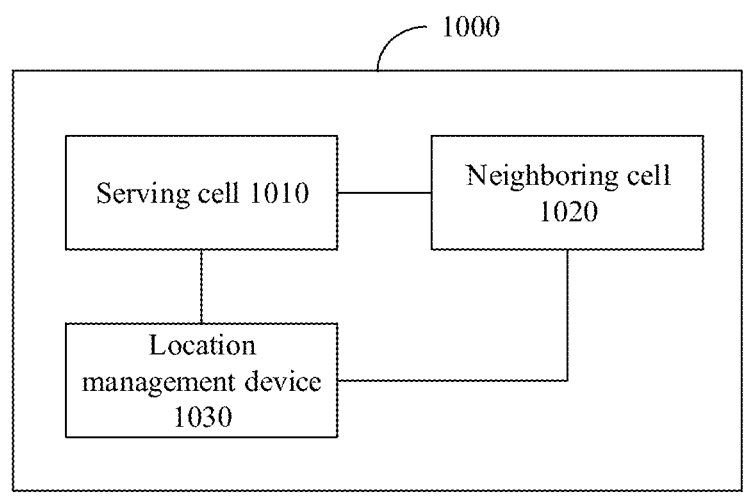
FIG. 10 is a schematic block diagram of a signal transmission system according to an embodiment of this application.

As shown in FIG. 10, an embodiment of this application further provides a signal transmission system 1000, including a serving cell 1010 and a neighboring cell 1020 that are of a terminal device, and a location management device 1030.

The serving cell 1010 corresponds to the serving cell in the foregoing embodiments, the neighboring cell 1020 corresponds to the neighboring cell in the foregoing embodiments, and the location management device 1030 corresponds to the location management device in the foregoing embodiments.

An embodiment of this application further provides a computer-readable storage medium. The computer-readable storage medium stores a computer program. When the computer program is executed by a computer, the computer is enabled to implement the method on the serving base station side or the method on the neighboring base station side in the foregoing method embodiments.

An embodiment of this application further provides a computer program product including instructions. When the instructions are executed by a computer, the computer is enabled to implement the method on the serving base station side or the method on the neighboring base station side in the foregoing method embodiments.

For explanations and beneficial effects of related content of any of the communication apparatuses provided above, refer to the corresponding method embodiment provided above. Details are not described herein again.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, contacts, word processing software, and instant messaging software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain, and/or carry instructions and/or data.

It should be understood that, the processor mentioned in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) is integrated into the processor.

It should be noted that the memory described in this specification aims to include but is not limited to these memories and any memory of another appropriate type.

A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
receiving, by a serving base station, downlink reference signal resource configuration information from a neighboring base station;
sending, to a terminal device, a downlink reference signal measurement request that comprises the downlink reference signal resource configuration information, wherein the downlink reference signal resource configuration information includes a beam information that indicates a time-frequency resource of a downlink reference signal to obtain a downlink reference signal measurement result by the terminal device;
receiving, from the terminal device, the downlink reference signal measurement result based on the downlink reference signal resource configuration information; and
sending the downlink reference signal measurement result to the neighboring base station, or sending, to the neighboring base station, the beam information based on the downlink reference signal measurement result, wherein the beam information relates to a beam between the neighboring base station and the terminal device, the beam information being used by the neighboring base station for receiving the downlink reference signal measurement result from the terminal device, wherein receiving, by the serving base station, the downlink reference signal resource configuration information from the neighboring base station comprises:

sending a downlink reference signal sending request message to the neighboring base station, wherein the downlink reference signal sending request message comprises second downlink reference signal resource configuration information;

receiving a downlink reference signal sending response from the neighboring base station, wherein the downlink reference signal sending response comprises third downlink reference signal resource configuration information that is based on the second downlink reference signal resource configuration information, sending the downlink reference signal sending request message to the neighboring base station comprises:

receiving an authorization message from a location management device, wherein the authorization message indicates that the serving base station is authorized to guide downlink reference signal measurement of the neighboring base station, and the authorization message comprises identification information of the neighboring base station; and sending the downlink reference signal sending request message to the neighboring base station based on the authorization message.

2. The method according to claim 1, the method further comprises:

sending the beam information to the terminal device.

3. The method according to claim 2, wherein the sending the beam information to the terminal device comprises:

sending a sounding reference signal (SRS) request message to the terminal device, wherein the SRS request message comprises SRS resource configuration information and the beam information.

4. The method according to claim 1, wherein the authorization message comprises information indicating that an authorization state is enabled and wherein, after the downlink reference signal measurement of the neighboring base station is completed, the method further comprises:

receiving a message comprising information indicating that the authorization state is disabled from the location management device.

5. The method according to claim 1, wherein the downlink reference signal resource configuration information comprises the beam information that indicates the time-frequency resource of the downlink reference signal, and the beam information that indicates the time-frequency resource of the downlink reference signal comprises one or more of the following:

an index of an OFDM symbol on which the downlink reference signal is located, an index of an RB on which the downlink reference signal is located, a subcarrier spacing of the downlink reference signal, and a center frequency of the downlink reference signal.

6. The method according to claim 5, wherein the downlink reference signal resource configuration information further comprises at least one of the following information:

a type of the downlink reference signal, a number of transmissions of the downlink reference signal, and an antenna port number of the downlink reference signal.

7. A signal transmission method, comprising:

sending, by a neighboring base station, downlink reference signal resource configuration information to a serving base station; and receiving, from the serving base station, a downlink reference signal measurement result based on the downlink reference signal resource configuration information, wherein the downlink reference signal resource configuration information includes beam information that indicates a time-frequency resource of a downlink reference signal to obtain a downlink reference signal measurement result by the terminal device; and determining the beam information based on the downlink reference signal measurement result or receiving the beam information from the serving base station, the beam information being used by the neighboring base station for receiving the downlink reference signal measurement result from the terminal device, wherein sending, by the neighboring base station, the downlink reference signal resource configuration information to the serving base station comprises:

receiving an authorization message from a location management device, wherein the authorization message indicates that the serving base station is authorized to guide downlink reference signal measurement of the neighboring base station, and the authorization message comprises identification information of the serving base station; and sending the downlink reference signal resource configuration information to the serving base station based on the authorization message.

8. The method according to claim 7, wherein the method further comprises:

measuring, based on the beam information, a sounding reference signal (SRS) sent by a terminal device.

9. The method according to claim 7, wherein the authorization message comprises information indicating that an authorization state is enabled and wherein, after the downlink reference signal measurement of the neighboring base station is completed, the method further comprises:

receiving a message comprising information indicating that the authorization state is disabled from the location management device.

10. The method according to claim 7, wherein sending, by the neighboring base station, the downlink reference signal resource configuration information to the serving base station comprises:

receiving a downlink reference signal sending request message from the serving base station, wherein the downlink reference signal sending request message comprises second downlink reference signal resource configuration information; and sending, to the serving base station based on the downlink reference signal sending request message, third downlink reference signal resource configuration information determined based on the second downlink reference signal resource configuration information.

11. The method according to claim 7, wherein the downlink reference signal resource configuration information comprises the beam information that indicates the time-frequency resource of the downlink reference signal, and the beam information that indicates the time-frequency resource of the downlink reference signal comprises one or more of the following:

an index of an OFDM symbol on which the downlink reference signal is located, an index of an RB on which the downlink reference signal is located, a subcarrier spacing of the downlink reference signal, and a center frequency of the downlink reference signal.

12. The method according to claim 11, wherein the downlink reference signal resource configuration information further comprises at least one of the following information:

a type of the downlink reference signal, a number of transmissions of the downlink reference signal, and an antenna port number of the downlink reference signal.

* * * * *